US010545236B2

(12) United States Patent
Phillips et al.

(10) Patent No.: US 10,545,236 B2
(45) Date of Patent: Jan. 28, 2020

(54) SONAR TRANSDUCER ASSEMBLY HAVING A PRINTED CIRCUIT BOARD WITH FLEXIBLE ELEMENT TABS

(71) Applicant: NAVICO HOLDING AS, Egersund (NO)

(72) Inventors: Roger Phillips, Auckland (NZ); Barry M. Antao, Owasso, OK (US); Jayme J. Caspall, Broken Arrow, OK (US)

(73) Assignee: NAVICO HOLDING AS, Egersund (NO)

( * ) Notice: Subject to any disclaimer, the term of this patent is extended or adjusted under 35 U.S.C. 154(b) by 311 days.

(21) Appl. No.: 15/706,979

(22) Filed: Sep. 18, 2017

(65) Prior Publication Data

US 2019/0086537 A1    Mar. 21, 2019

(51) Int. Cl.
| | | |
|---|---|---|
| *G01S 15/89* | (2006.01) | |
| *G01S 7/521* | (2006.01) | |
| *G10K 11/08* | (2006.01) | |
| *G10K 11/35* | (2006.01) | |
| *G10K 11/00* | (2006.01) | |

(52) U.S. Cl.
CPC ............. *G01S 15/89* (2013.01); *G01S 7/521* (2013.01); *G10K 11/008* (2013.01); *G10K 11/352* (2013.01)

(58) Field of Classification Search
CPC ....... G01S 15/89; G01S 7/521; G10K 11/352; G10K 11/008
See application file for complete search history.

(56) References Cited

U.S. PATENT DOCUMENTS

| | | | |
|---|---|---|---|
| 5,214,841 A | 6/1993 | Howard et al. | |
| 5,251,946 A | 10/1993 | Rossmeisl et al. | |
| 5,564,888 A | 10/1996 | Doan | |

(Continued)

FOREIGN PATENT DOCUMENTS

| | | | | |
|---|---|---|---|---|
| AU | 2018226431 A1 * | 4/2019 | ............. | G01S 7/521 |
| CA | 3017200 A1 * | 3/2019 | ............. | G01S 15/89 |

(Continued)

OTHER PUBLICATIONS

Extended European Search Report for corresponding European Patent Application No. 18193263.3 dated Jan. 17, 2019.

*Primary Examiner* — Daniel Pihulic

(74) *Attorney, Agent, or Firm* — Nelson Mullins Riley & Scarborough LLP

(57) ABSTRACT

An example sonar transducer assembly is provided including at least one transducer element and a flexible printed circuit board (PCB) including at least one set of electrical connections for the at least one transducer element. The electrical connections include flex tabs configured to flex out of a PCB plane. The sonar transducer assembly also includes a support structure including an aperture for the at least one transducer element. The support structure is configured to support the body of the PCB, allow flexion of the flex tabs into the aperture, and retain the at least one transducer element in the at least one aperture. The transducer element is installed in a direction that is perpendicular to the PCB plane causing the flex tabs to flex outwardly from the PCB plane, thereby creating an elastic force of the flex tabs applied against opposing ends of the at least one transducer element.

25 Claims, 24 Drawing Sheets

(56) References Cited

U.S. PATENT DOCUMENTS

| | | |
|---|---|---|
| 5,629,578 A | 5/1997 | Winzer et al. |
| 5,743,001 A | 4/1998 | Baker et al. |
| 5,808,967 A | 9/1998 | Yu et al. |
| 6,877,219 B1 | 4/2005 | Theriault et al. |
| 9,182,486 B2 | 11/2015 | Brown et al. |
| 9,423,258 B2 | 8/2016 | Kabel et al. |
| 9,423,259 B2 | 8/2016 | Kabel et al. |
| 9,739,884 B2 | 8/2017 | Proctor et al. |
| 9,766,328 B2 | 9/2017 | Black et al. |
| 9,784,832 B2 | 10/2017 | Proctor et al. |
| 9,851,206 B2 | 12/2017 | Kabel et al. |
| 2005/0234341 A1 | 10/2005 | Oliver |
| 2009/0189488 A1 | 7/2009 | Ray et al. |
| 2012/0277639 A1* | 11/2012 | Pollock ................. B06B 1/0629 601/2 |
| 2013/0208568 A1 | 8/2013 | Coleman |
| 2015/0166335 A1 | 6/2015 | Loeppert et al. |
| 2016/0061951 A1 | 3/2016 | Brown et al. |
| 2016/0259049 A1 | 9/2016 | Proctor et al. |
| 2016/0259050 A1 | 9/2016 | Proctor et al. |
| 2016/0259051 A1 | 9/2016 | Proctor et al. |
| 2016/0320474 A1 | 11/2016 | Proctor et al. |
| 2017/0146642 A1 | 5/2017 | Stokes et al. |
| 2017/0219703 A1 | 8/2017 | Proctor et al. |
| 2017/0285167 A1 | 10/2017 | Proctor et al. |
| 2019/0086537 A1* | 3/2019 | Phillips ................... G01S 15/89 |

FOREIGN PATENT DOCUMENTS

| | | | |
|---|---|---|---|
| CN | 102931869 A | 2/2013 | |
| EP | 2414789 B1 | 5/2013 | |
| EP | 3457171 A1 * | 3/2019 | ............. G01S 15/89 |

* cited by examiner

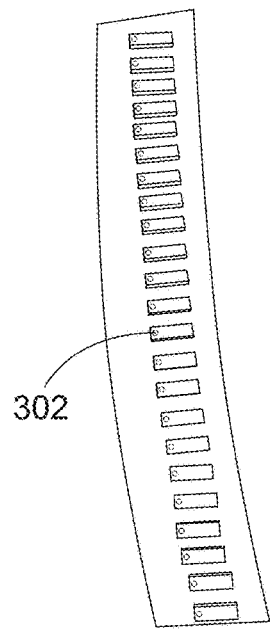 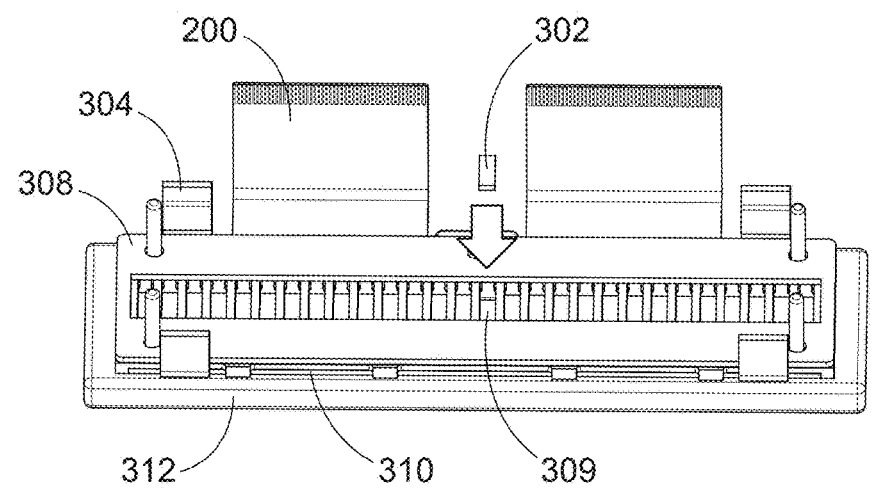
FIG. 19  FIG. 20A
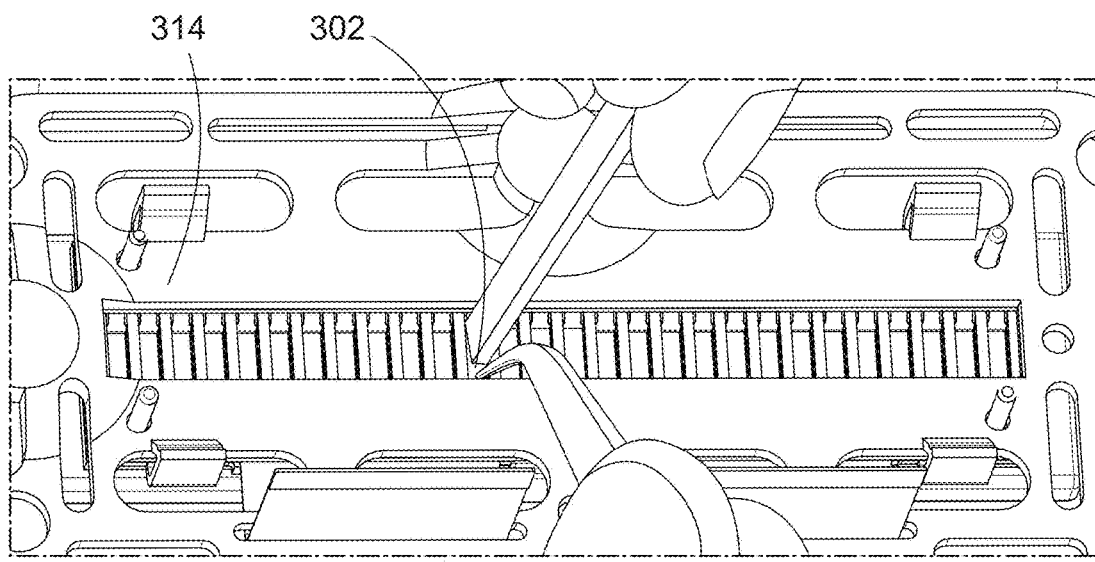
FIG. 20B

SONAR TRANSDUCER ASSEMBLY HAVING A PRINTED CIRCUIT BOARD WITH FLEXIBLE ELEMENT TABS

FIELD OF THE INVENTION

Embodiments of the present invention relate generally to sonar transducer assemblies, and more particularly, to sonar transducer assemblies having a printed circuit board with flexible element tabs configured to hold transducer elements.

BACKGROUND OF THE INVENTION

Sonar (SOund Navigation And Ranging) is used to detect waterborne or underwater objects. For example, sonar devices may be used to determine depth and bottom topography, detect fish, locate wreckage, etc. Sonar transducer elements, or simply transducers, convert electrical energy into sound or vibrations at a particular frequency. A sonar sound beam is transmitted into and through the water and is reflected from objects it encounters. The transducer receives the reflected sound (the "sonar returns") and converts the sound energy into electrical energy. Based on the known speed of sound, it is possible to determine the distance to and/or location of the waterborne or underwater objects. The sonar return signals can also be processed to be displayed on a display device, giving the user a "picture" of the underwater environment.

Applicant herein provides improved techniques and assemblies for producing sonar transducer assemblies.

BRIEF SUMMARY OF THE INVENTION

Sonar transducer assemblies may be formed, in some cases, using one or more transducer elements that are installed or mounted in mechanical and electrical contact with a printed circuit board (PCB). The transducer elements may be soldered to the electrical contact pads on the PCB. The PCB is an elastic wave bearing structure. Acoustic transducer elements, such as used in sonar systems, attached to the PCB are, in general, points of coupling incoming sound from the environment into the various elastic wave types supported by the PCB. The elastic waves, so excited, may propagate in all directions within the PCB, scattering from the various boundaries and attached structures (e.g. discrete electrical components), leading to a frequency- and location-dependent feedback to the transducer elements. The electrical output of the transducer elements can be, therefore, a combination of direct acoustic stimulation by the incoming sound plus indirect stimulation due to feedback through the elastic structure of the PCB. For brevity, the term "elastic response" shall be used to refer to the unwanted feedback from the structure to which the transducer elements are attached.

When, for the purpose of producing an array of spatially-arranged receivers or transmitters, more than one transducer element is placed in a sonar system, it is desirable, in order to effectively apply simple beamforming algorithms, that the electrical signals transduced by the transducer elements be uniform simple functions of the acoustic field that they are intended to sample (in the case of receiving) or produce (in the case of transmitting). Physical connections between the transducer elements and the PCB may not only produce an undesired signal involving the PCB as an elastic wave-bearing medium, but the mechanical impedance of the connections may also have a local effect on the frequency response of the transducer elements, e.g. mass loading by solder at the attachment points of the transducer elements. Inconsistencies in the mechanical boundary conditions at the point of electrical connections in addition to the elastic response of the PCB may cause undesired, chaotic electrical signals to be produced by the transducer elements, which may, for example, degrade the sonar image.

Some embodiments of the present invention contemplate a flex tab arrangement for the PCB of a sonar transducer assembly. Such a flex tab arrangement may mitigate the undesired signals caused by the elastic response of the PCB. Additionally, the element-to-element variations across the transducer assembly caused by inconsistencies in the mechanical boundary conditions due to inconsistent solder joints may be mitigated by removing the solder connection altogether.

In some embodiments, the PCB may include a set of flexible electrical connection tabs for each transducer element, e.g. piezoelectric crystal. The transducer element may be inserted into a section of the PCB between the flex tabs, thereby causing the flex tabs to flex outwardly from a plane defined by the PCB. In some embodiments, the flexion of the flex tabs outwardly of the PCB plane may cause an elastic force on each of the flex tabs to be applied to opposing ends of the transducer elements to create an electrical connection. In some embodiments, the flexion of the flex tabs may mechanically isolate the ends of the transducer elements from the PCB, thereby mitigating or eradicating interference from the elastic response of the PCB.

In this regard, in some embodiments, the transducer elements may not be affixed, such as by solder or adhesive, to the PCB. Instead, the force applied by the flex tabs on opposing ends of the installed transducer element may be sufficient to maintain the position of the transducer element as well as maintain an electrical connection to the transducer element. The removal of the solder connection to the PCB may further eliminate transference of the resonance waves from the transducer elements to the PCB. Further, removal of the solder connection may also remove inconsistencies in the mechanical boundary conditions of the electrical connections to the transducer elements, thereby reducing element-to-element variations across the transducer assembly and, in some cases, increasing the sharpness of the sonar image.

In an example embodiment, a sonar transducer assembly is provided including at least one transducer element and a flexible printed circuit board (PCB) including at least one set of electrical connections for the at least one transducer element. The electrical connections include flex tabs configured to flex out of a PCB plane defined by a body of the PCB. The sonar transducer assembly also includes a support structure including at least one aperture for the at least one transducer element. The support structure is configured to support the body of the PCB, allow flexion of the flex tabs into the aperture, and retain the at least one transducer element in the at least one aperture. The transducer element is installed into the aperture in a direction that is perpendicular to the PCB plane causing the flex tabs to flex outwardly from the PCB plane and the flexion of the flex tabs causes an elastic force of the flex tabs to be applied against opposing ends of the at least one transducer element.

In another example embodiment, a sonar transducer assembly is provided including a plurality of transducer elements, and a flexible printed circuit board (PCB) including a plurality of sets of electrical connections for the plurality of transducer elements. Each of the plurality of sets of electrical connections comprise flex tabs configured to flex out of a PCB plane defined by a body of the PCB. The sonar transducer assembly also includes a support structure including a plurality of apertures. Each of the plurality of apertures is configured to receive each of the plurality of transducer elements and the support structure is configured to support the body of the PCB, allow flexion of each of the flex tabs into a respective aperture of the plurality of apertures, and retain each of the plurality of transducer elements in the respective aperture of the plurality of apertures. Each of the plurality of transducer elements is held in the PCB and the support structure through an interference fit, wherein each of the plurality of transducer elements is installed between the flex tabs.

In still a further example embodiment, a sonar transducer assembly is provided including at least one transducer element and a flexible printed circuit board (PCB) including at least one set of electrical connections for the at least one transducer element. The electrical connections include flex tabs configured to flex out of a PCB plane defined by a body of the PCB, the at least one transducer element is installed between the flex tabs, and flexion of the flex tabs causes an elastic force of the flex tabs to be applied against opposing ends of the at least one transducer element.

In an example embodiment, the at least one transducer element is not affixed to the PCB.

In some example embodiments, the at least one set of electrical connections also includes point contacts extending outwardly from the flex tabs toward the at least one transducer element to increase pressure applied by the flex tabs on the at least one transducer element. In an example embodiment, the point contacts each include a dimple in a contact pad or an electrically conductive material added to a contact pad.

In some example embodiments, the at least one transducer element includes a plurality of transducer elements and the at least one aperture includes a plurality of apertures. Each of the plurality of transducer elements is disposed in a separate one of the plurality of apertures and the support structure and PCB provide resonance isolation for each of the plurality of transducer elements.

In an example embodiment, the support structure includes foam. In some example embodiments, the foam provides resistance to the flexion of the flex tabs to cause an increase in the elastic force applied to the opposing ends of the at least one transducer element. In an example embodiment, the aperture includes an H cut configured to enable a foam tab to flex out of a foam plane defined by a foam body.

In some example embodiments, the support structure also includes a base foam disposed on a first side of the foam and a top foam disposed on a second side of the foam. In an example embodiment, the top foam includes a slot cut configured to receive expanding foam therethrough. In some example embodiments, the base foam includes an element aperture for the at least one transducer element and the element aperture is configured to receive at least a portion of the flex tabs or a portion of the foam when the flex tabs are flexed.

In an example embodiment, the support structure includes a chassis formed from a rigid structural material.

In some example embodiments, at least a portion of the transducer assembly is filled with an expanding foam that is configured to retain the relative position of the at least one transducer element with respect to the support structure and the PCB.

In an example embodiment, the sonar transducer assembly also includes a housing configured to enclose the at least one transducer element, the support structure, and the PCB within a watertight volume and at least a portion of the housing that encloses the at least one transducer element, the support structure, and the PCB is filled with a potting material.

In some example embodiments, at least one of the PCB or the support structure includes a plurality of guide holes or notches configured to be positioned about a guide post or rib of an assembly fixture during assembly to align the PCB with the support structure.

Some example embodiments of the present invention include example sonar transducer assemblies and methods of manufacture thereof.

BRIEF DESCRIPTION OF THE DRAWINGS

Figure 1:
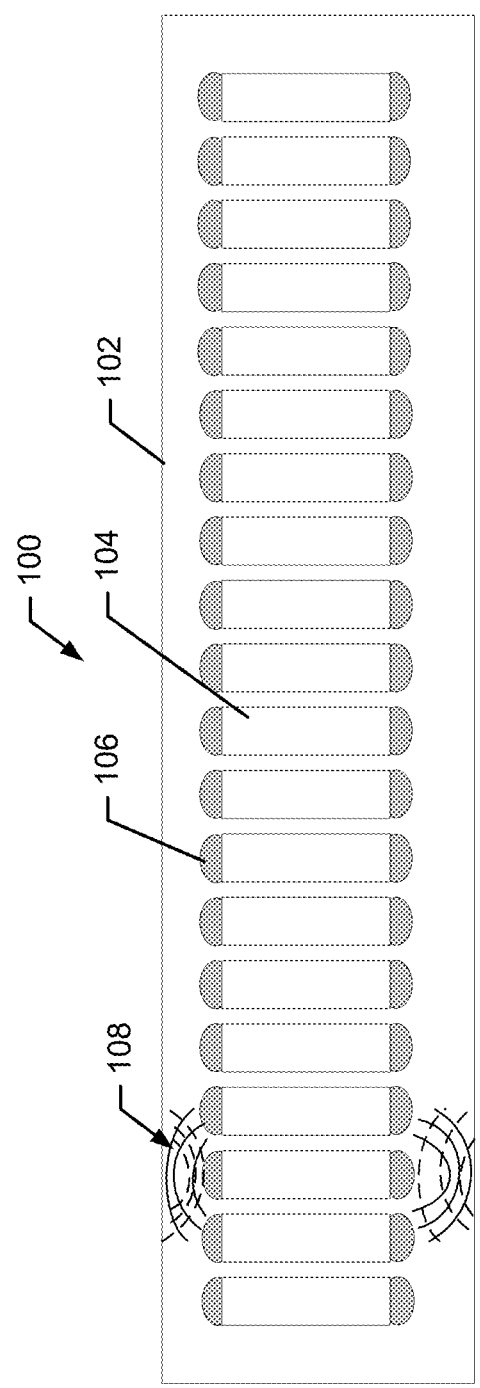
Figure 2A:
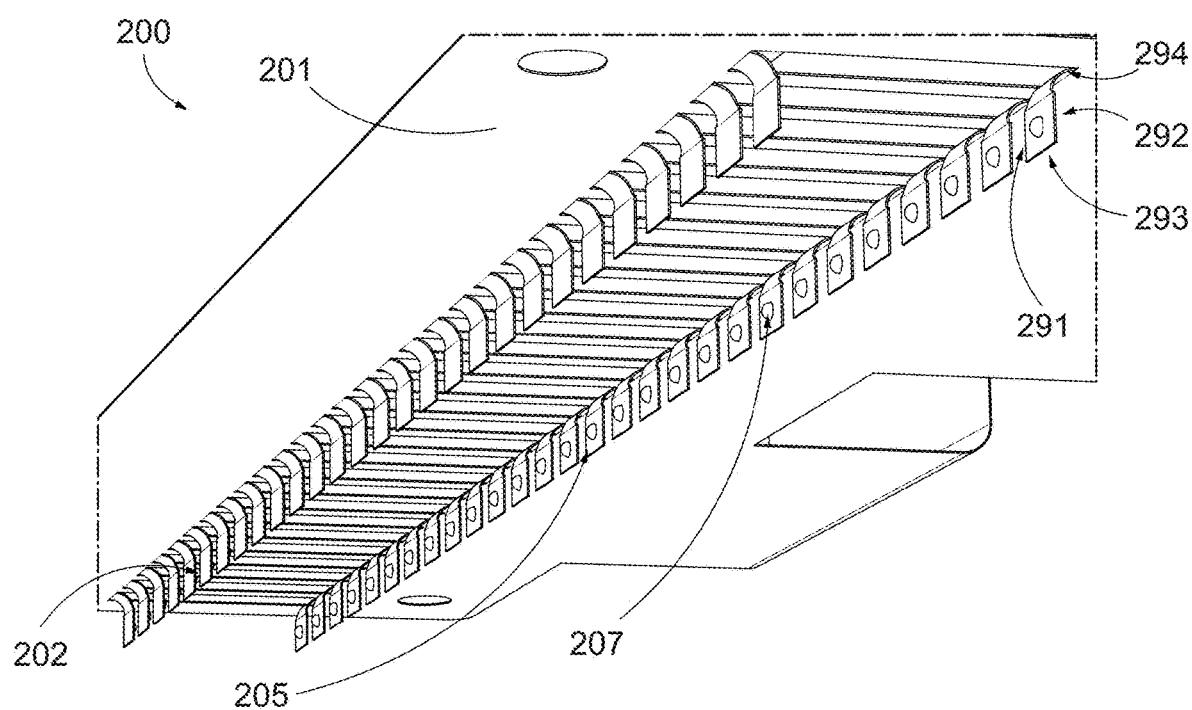
Figure 2B:
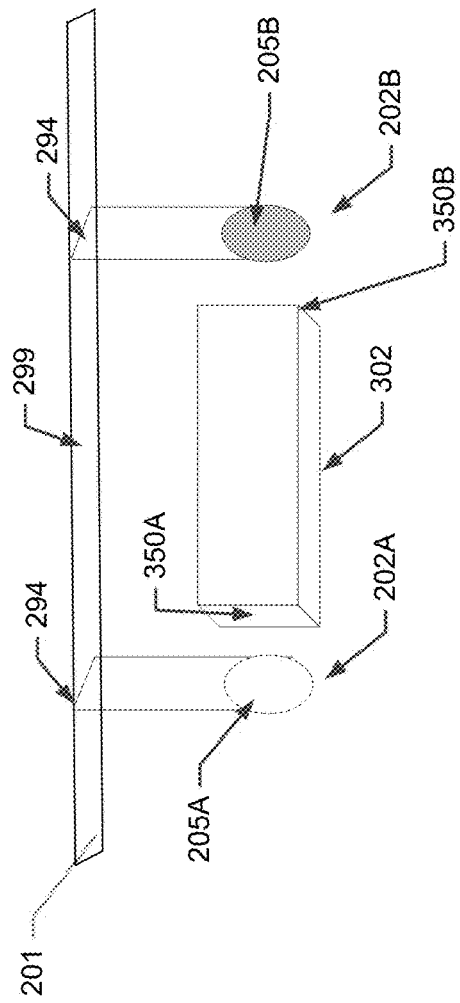
Figure 2C:
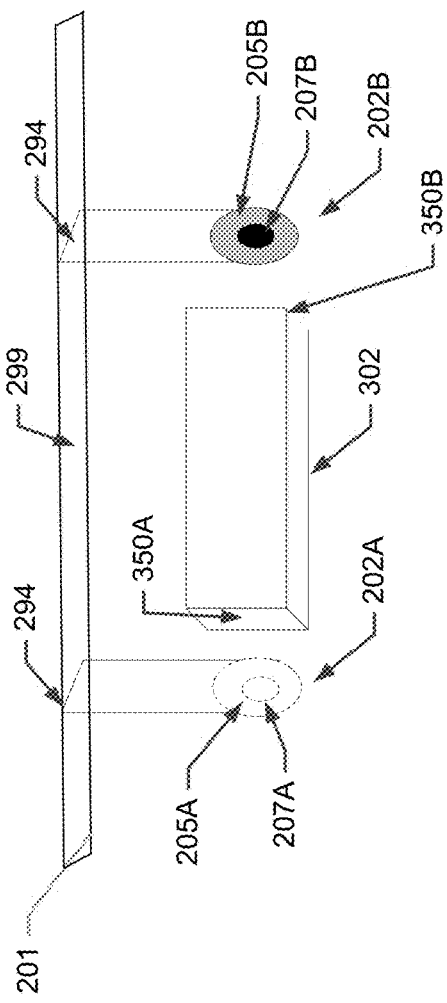
Figure 3:
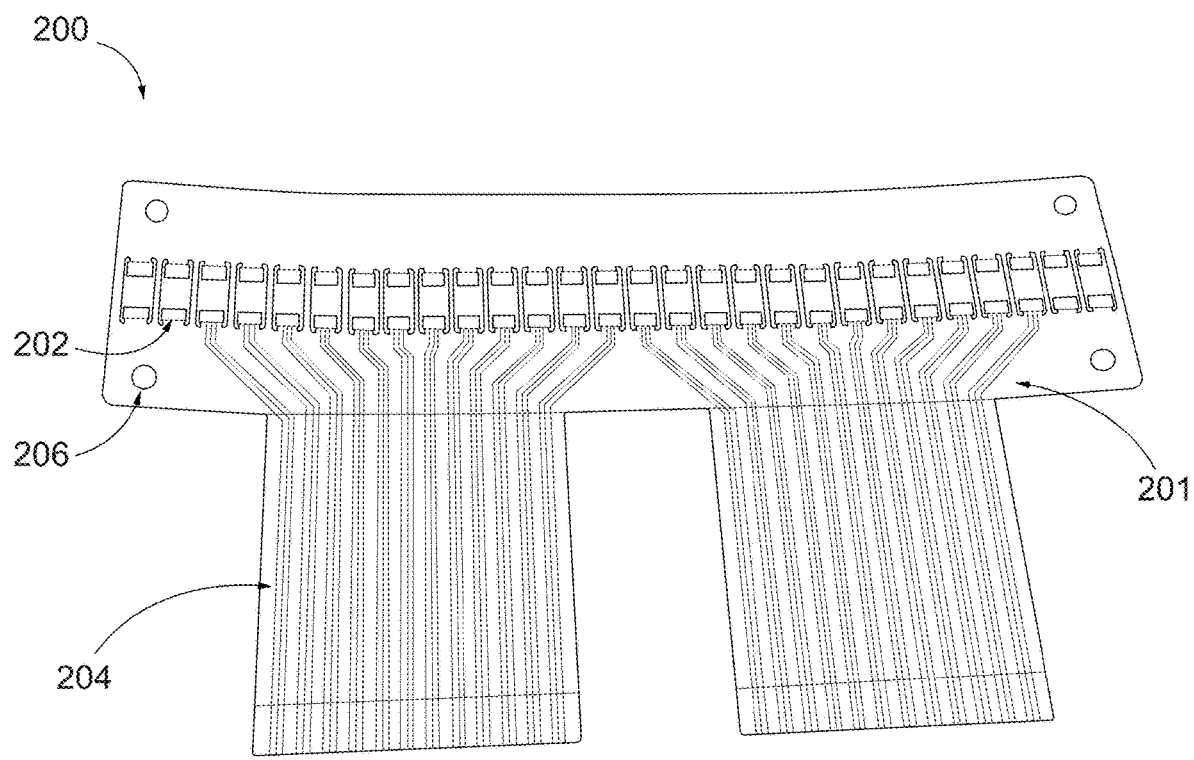
Figure 4:
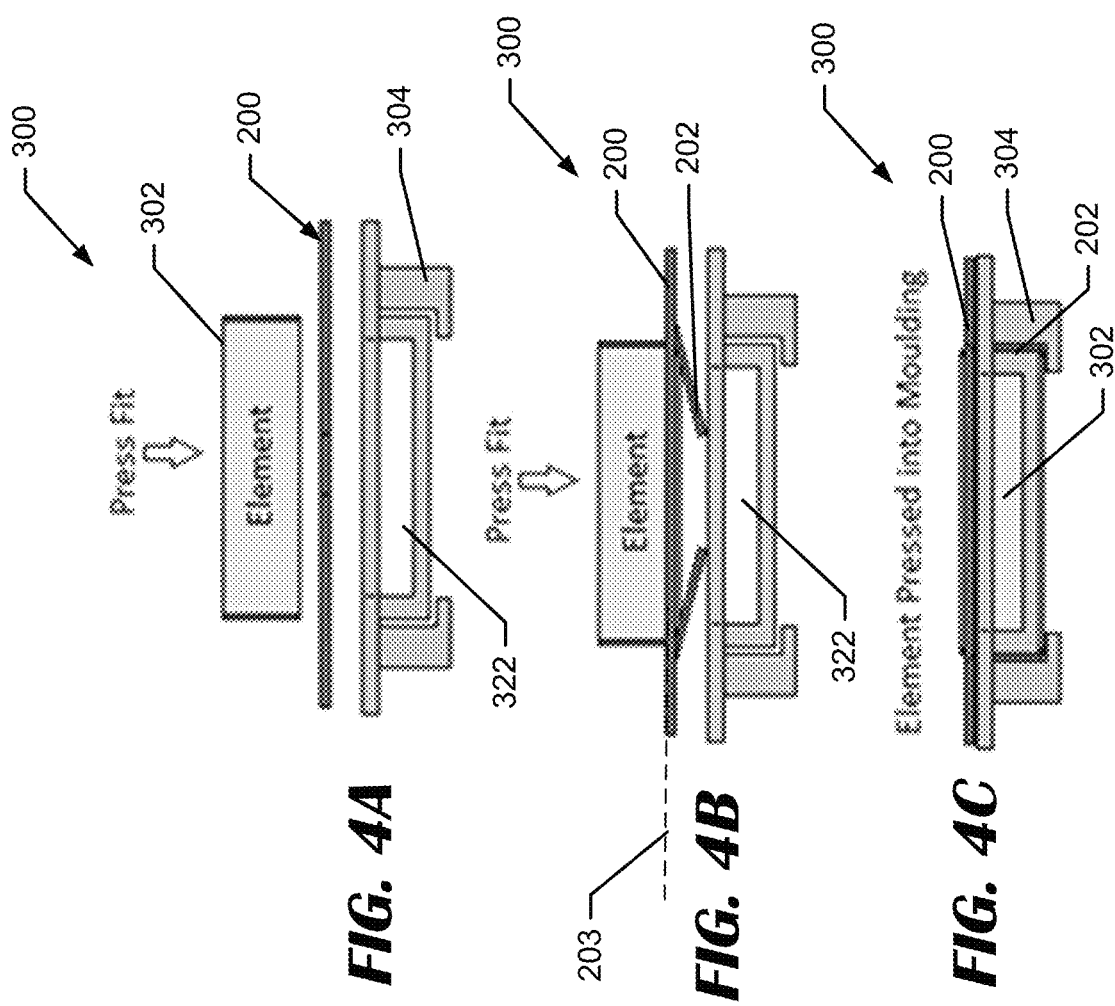
Figure 5:
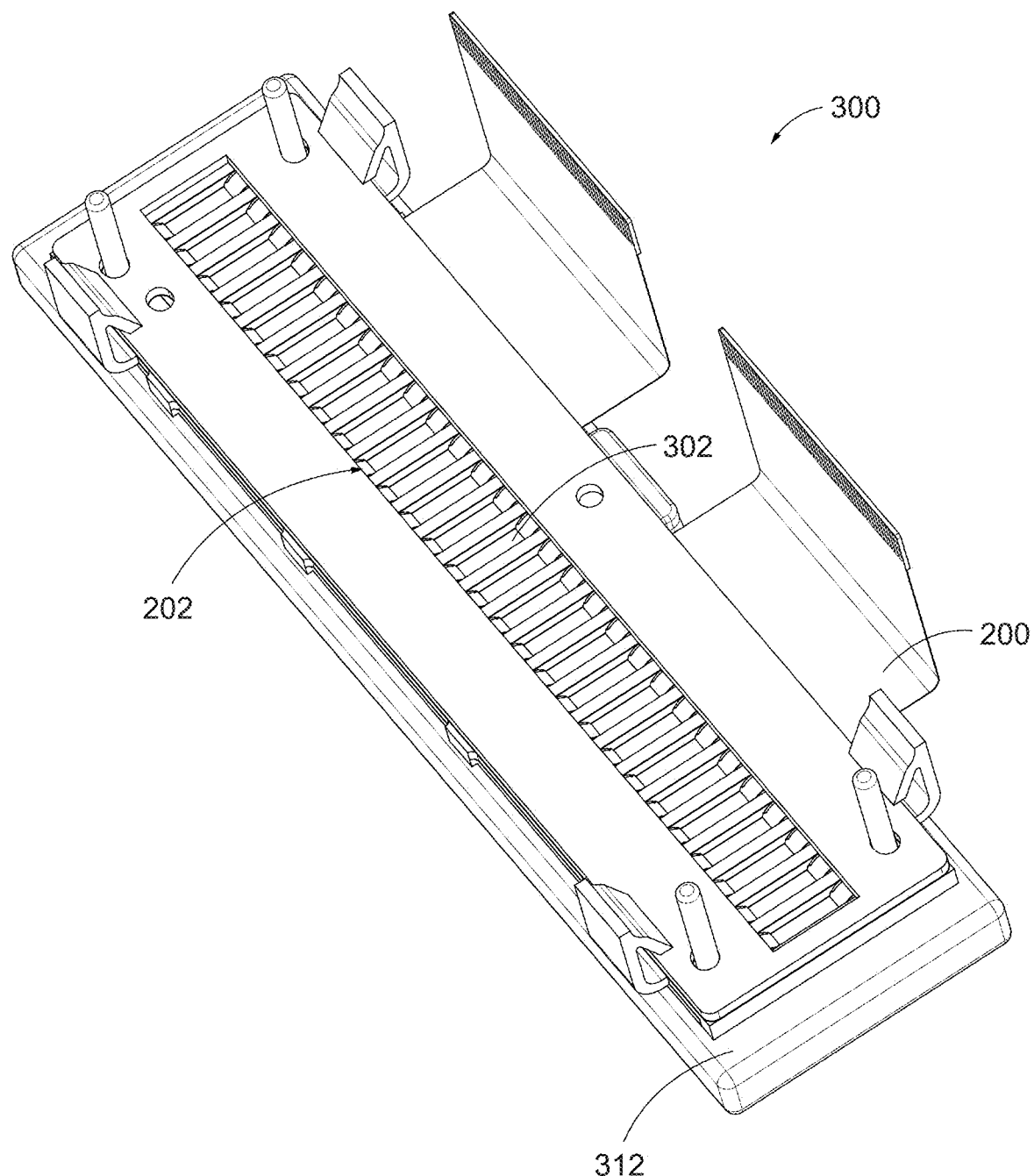
Figure 6:
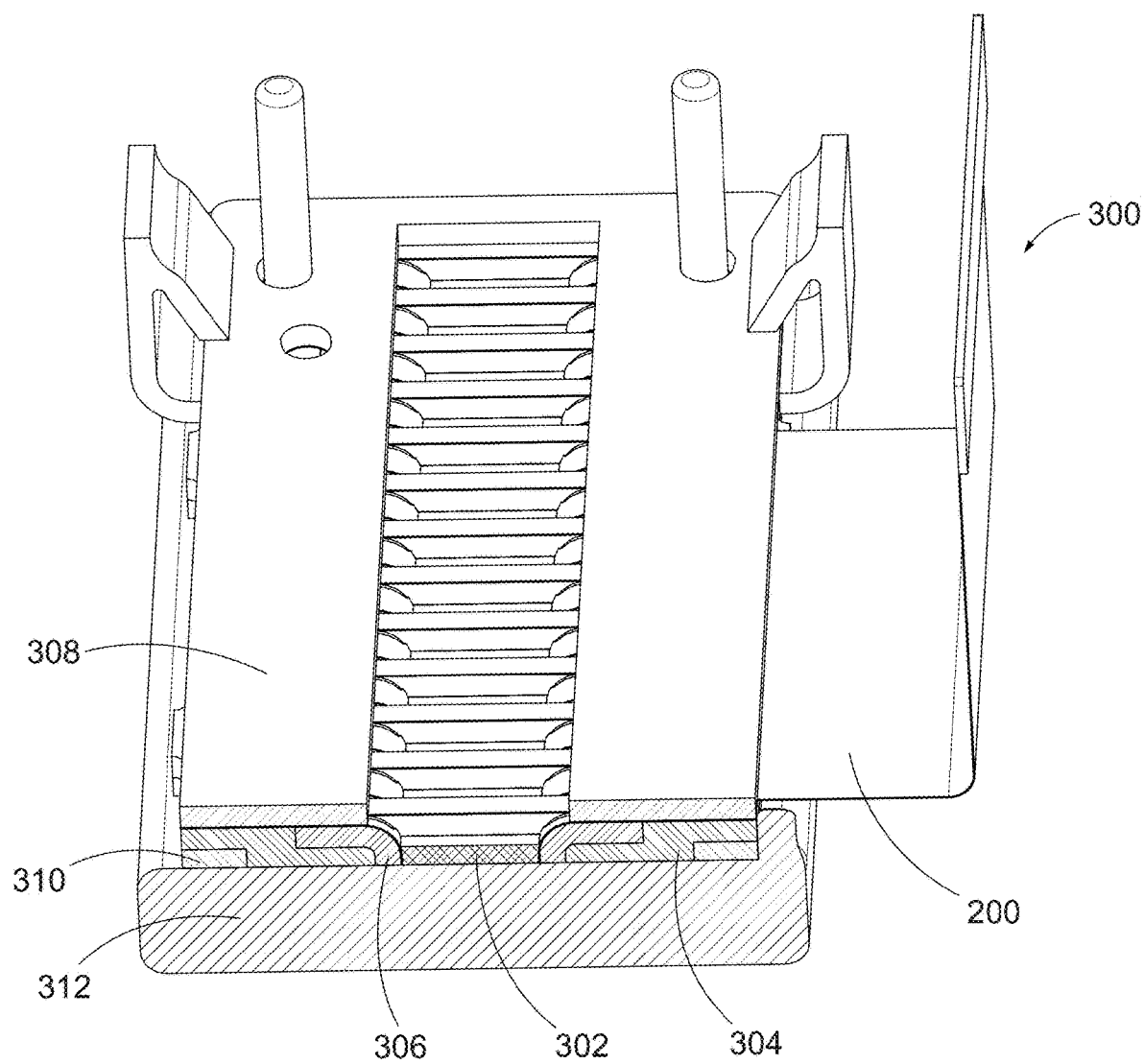
Figure 7:
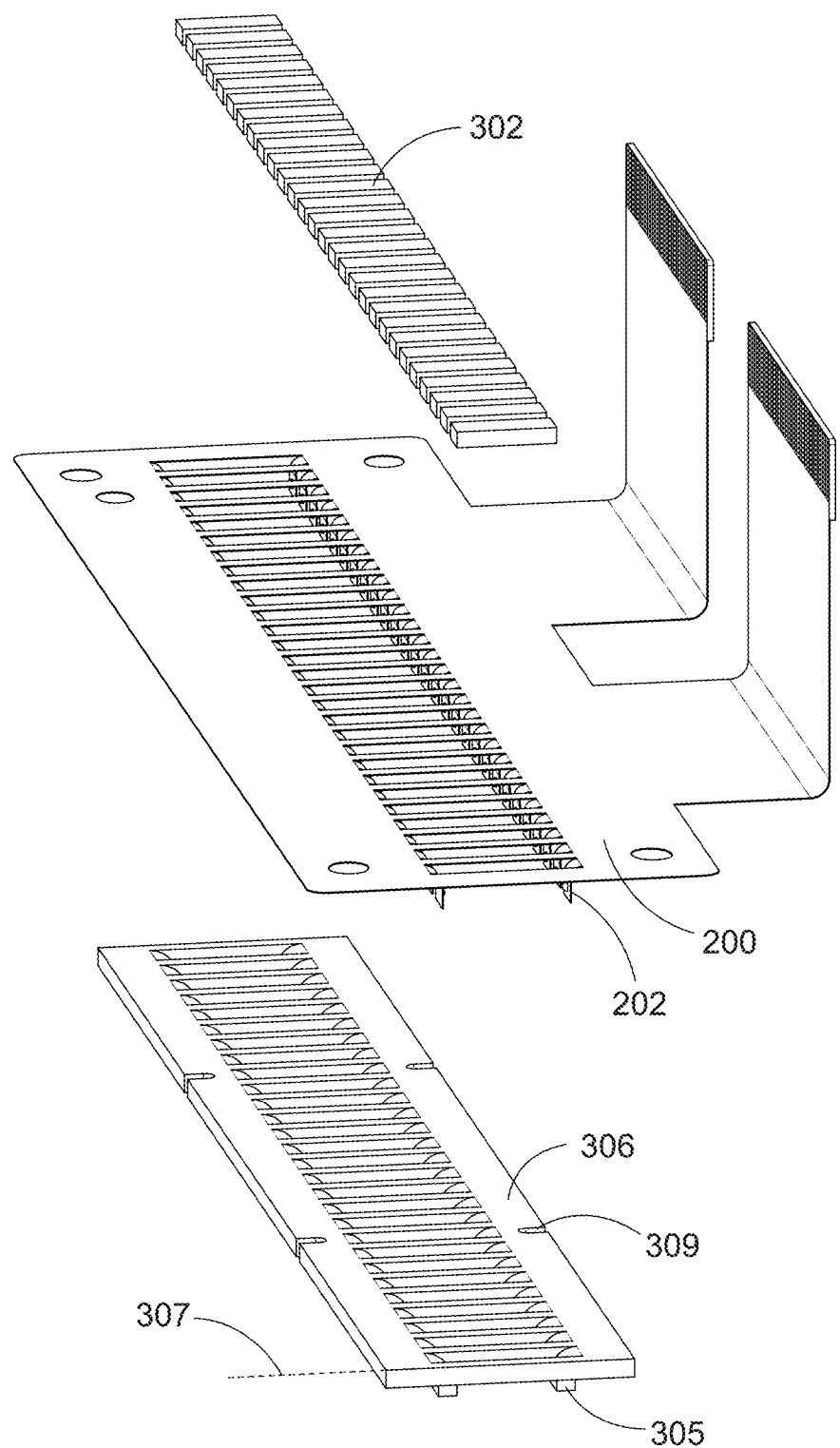
Figure 8:
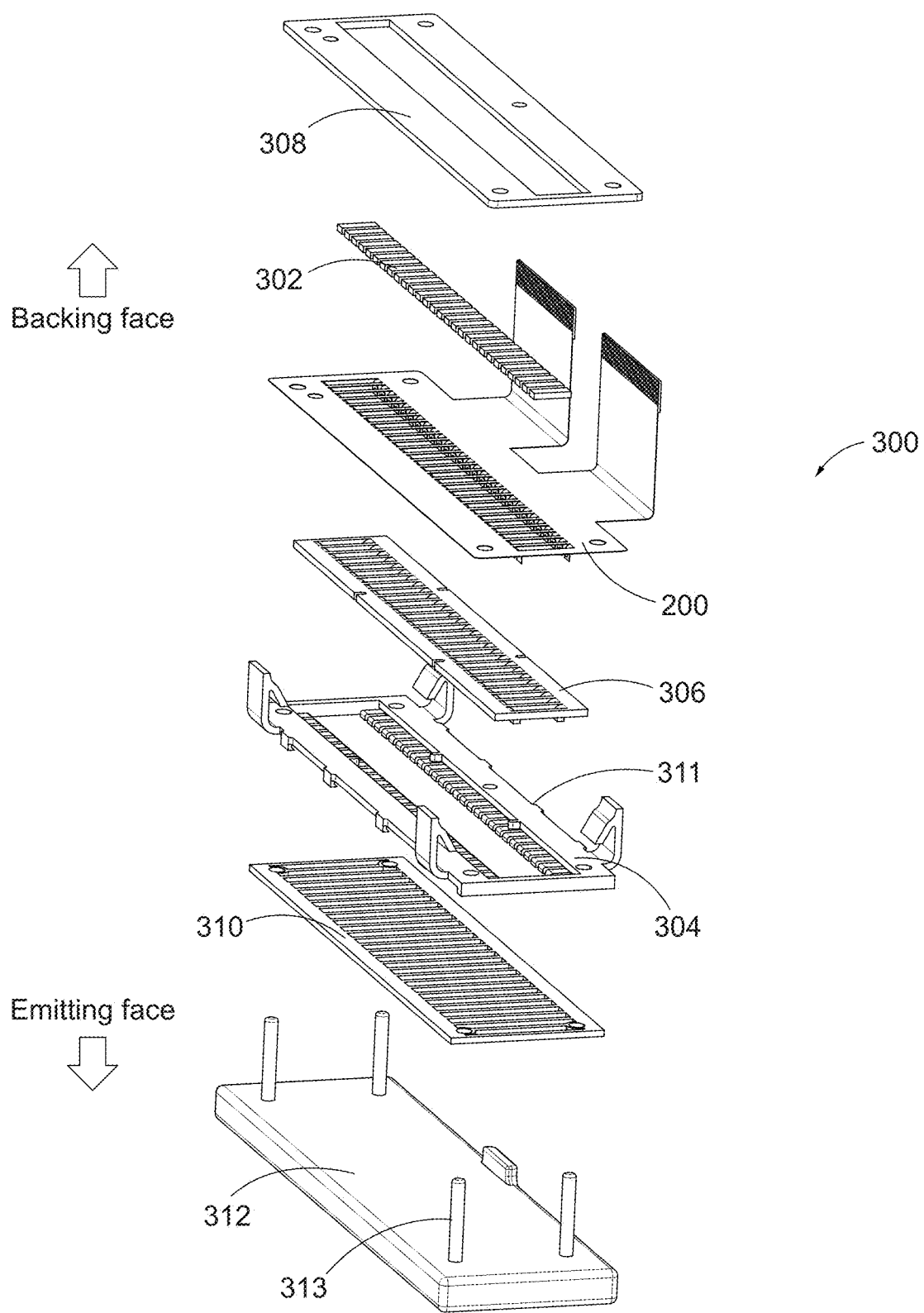
Figure 9:
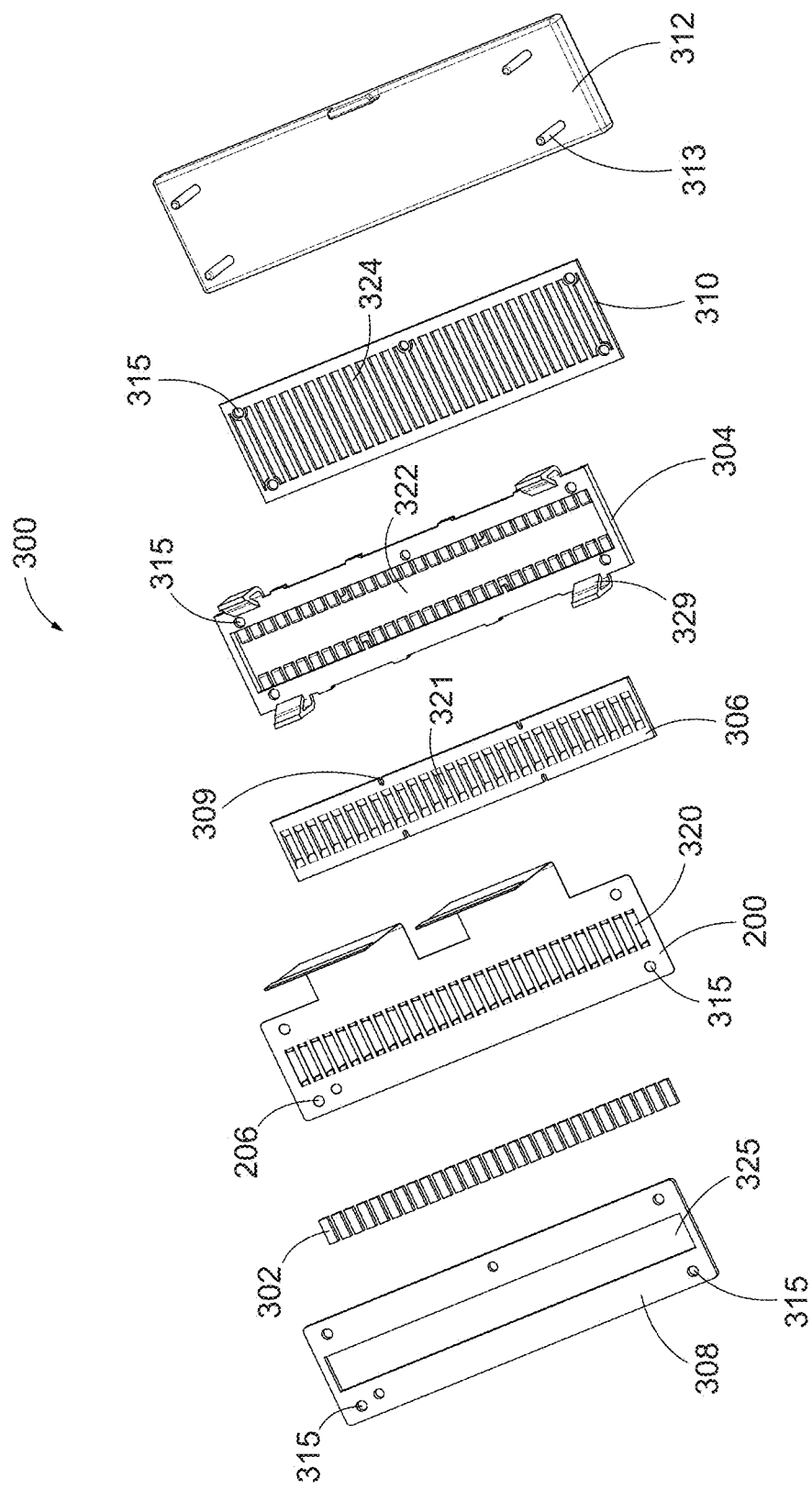
Figure 10:
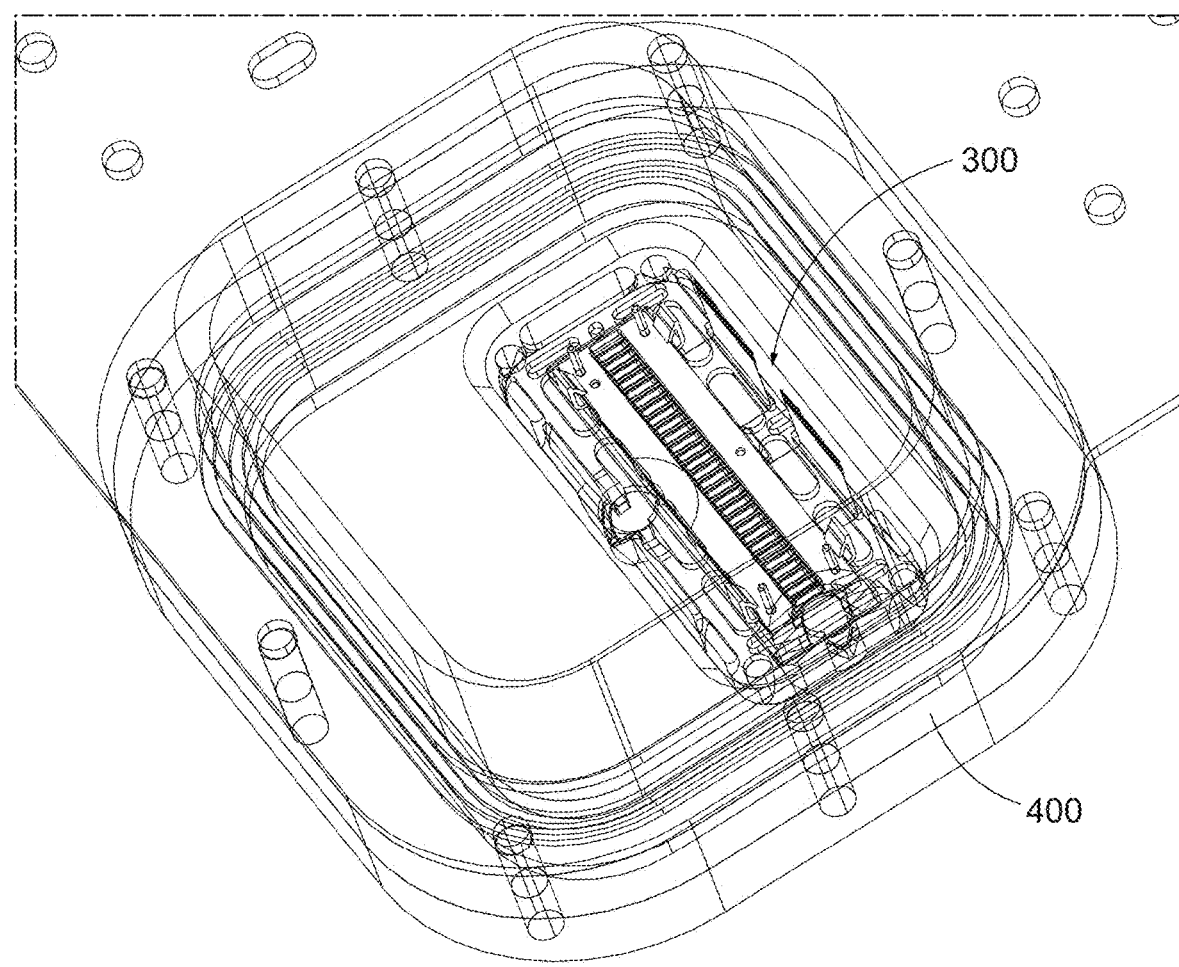
Figure 11A:
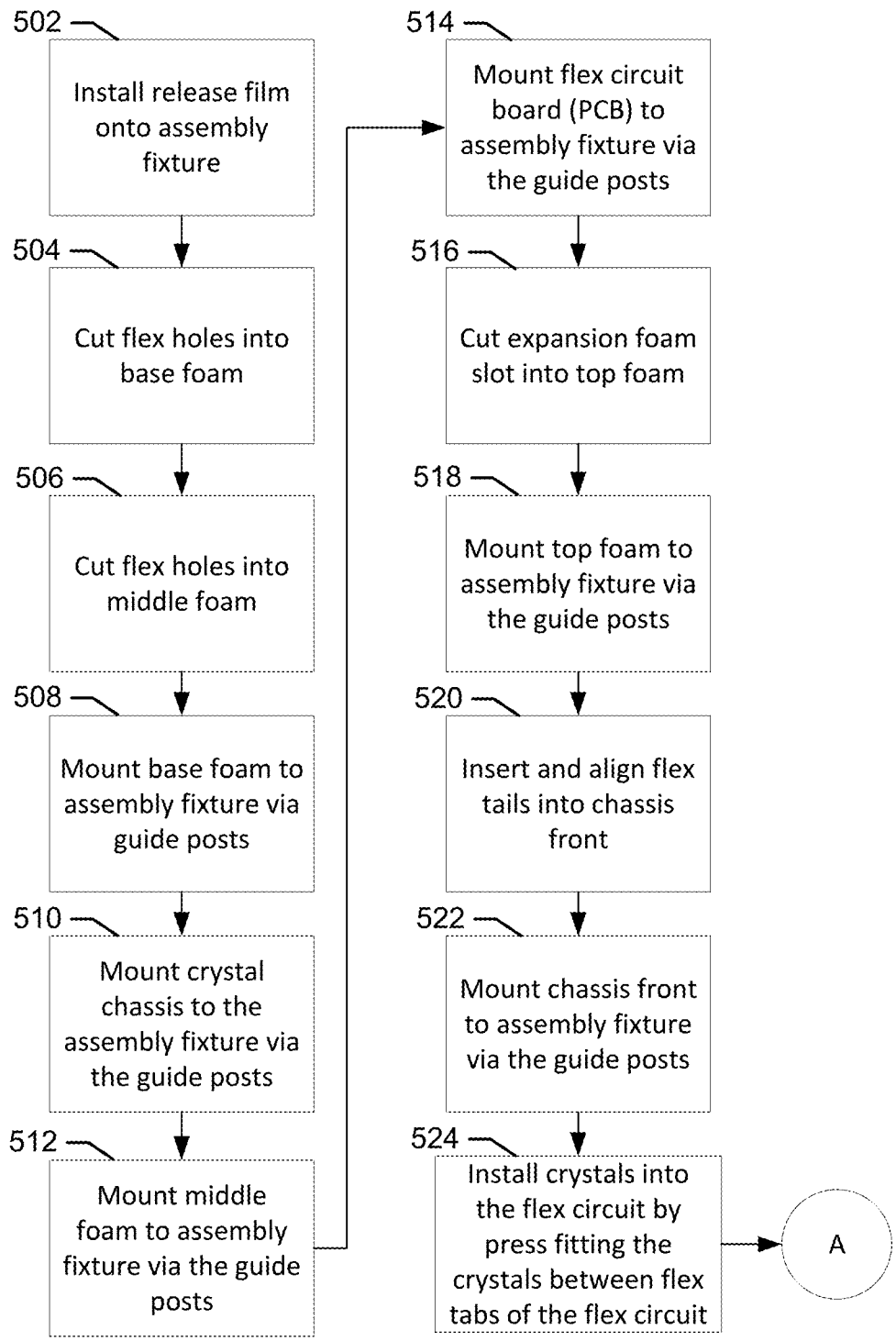
Figure 11B:
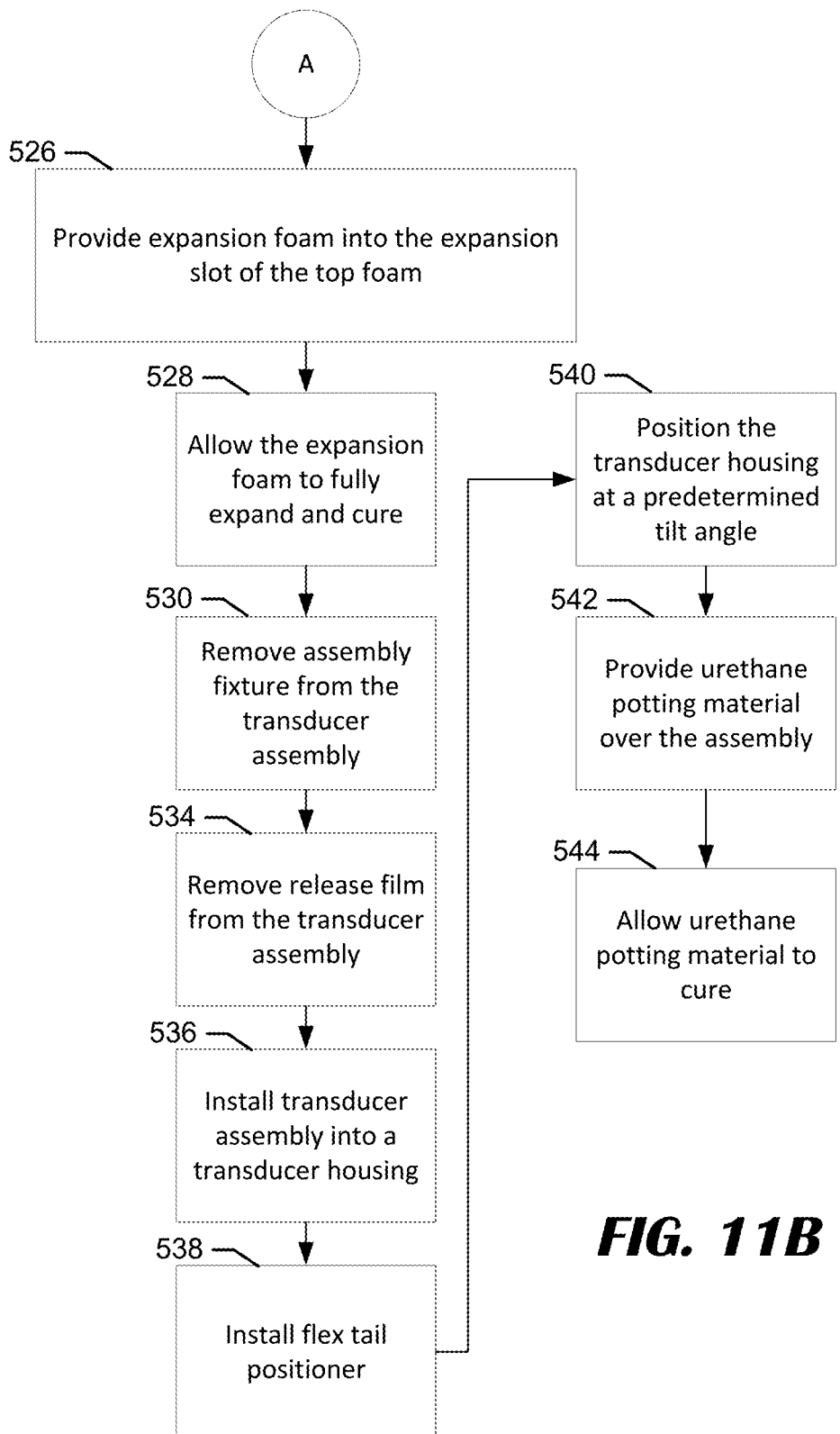
Figure 12A:
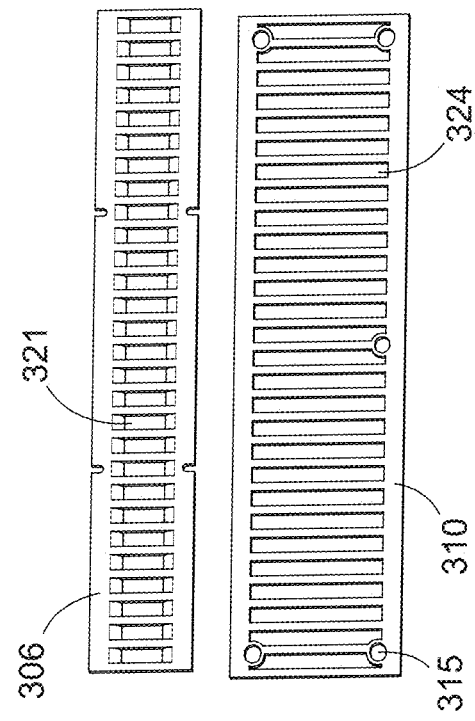
Figure 12B:
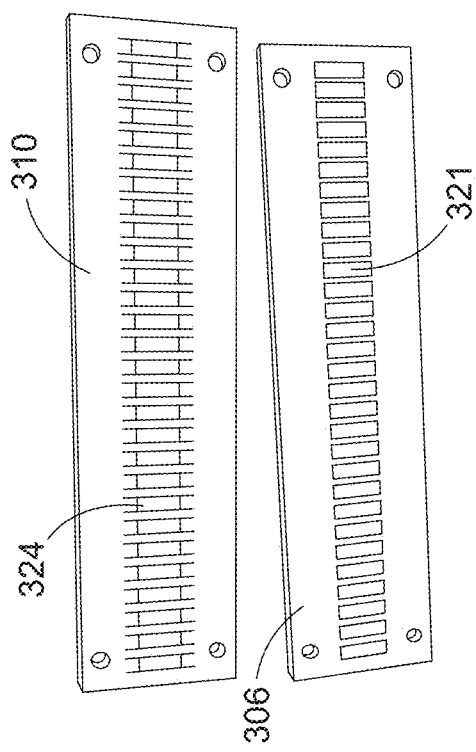
Figure 13A:
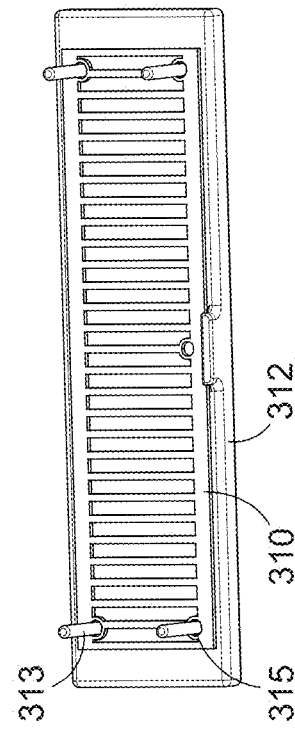
Figure 13B:
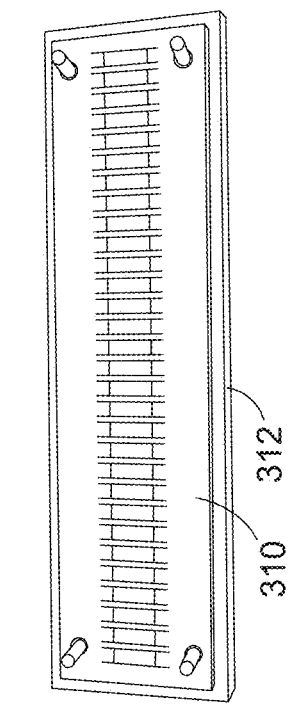
Figure 14B:
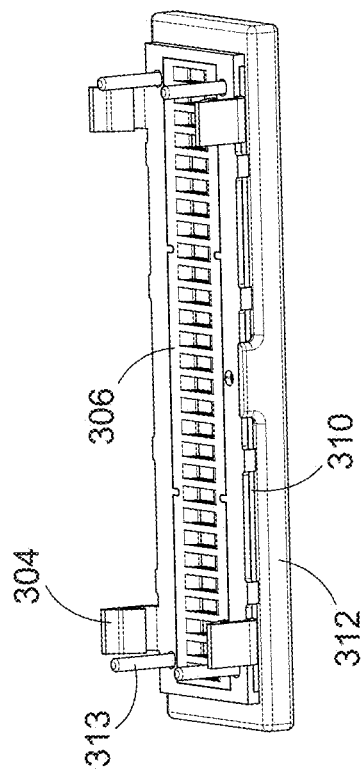
Figure 14A:
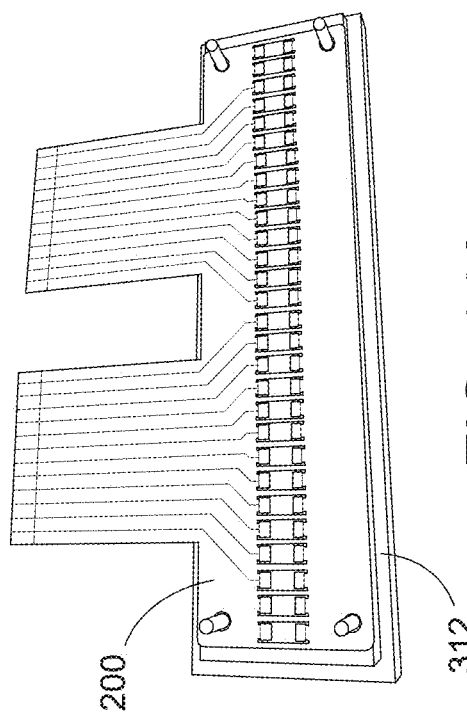
Figure 14C:
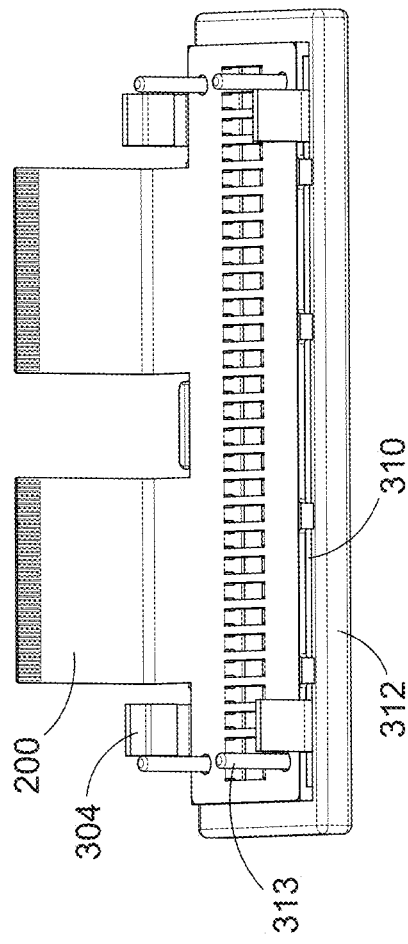
Figure 15A:
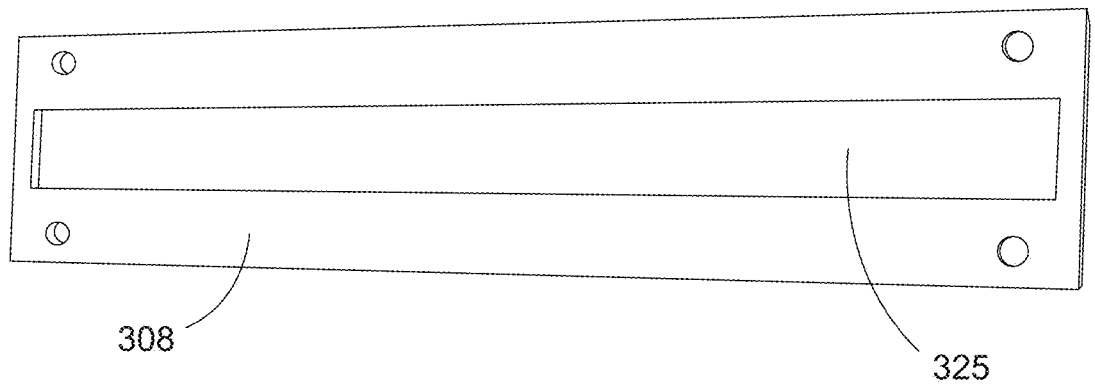
Figure 15B:
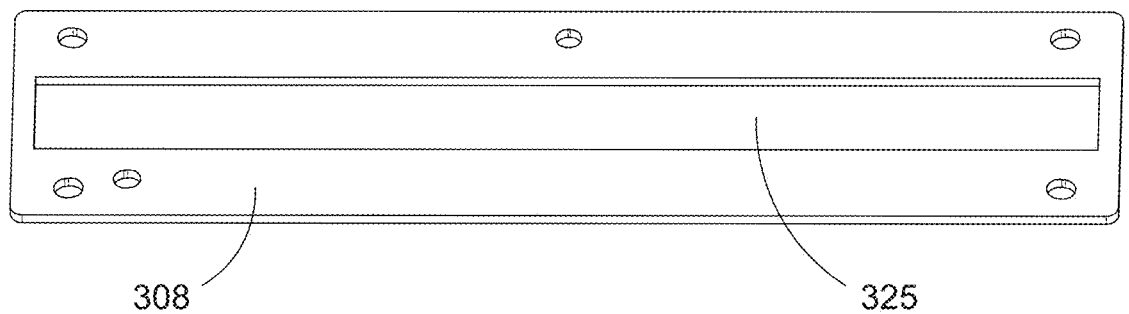
Figure 16A:
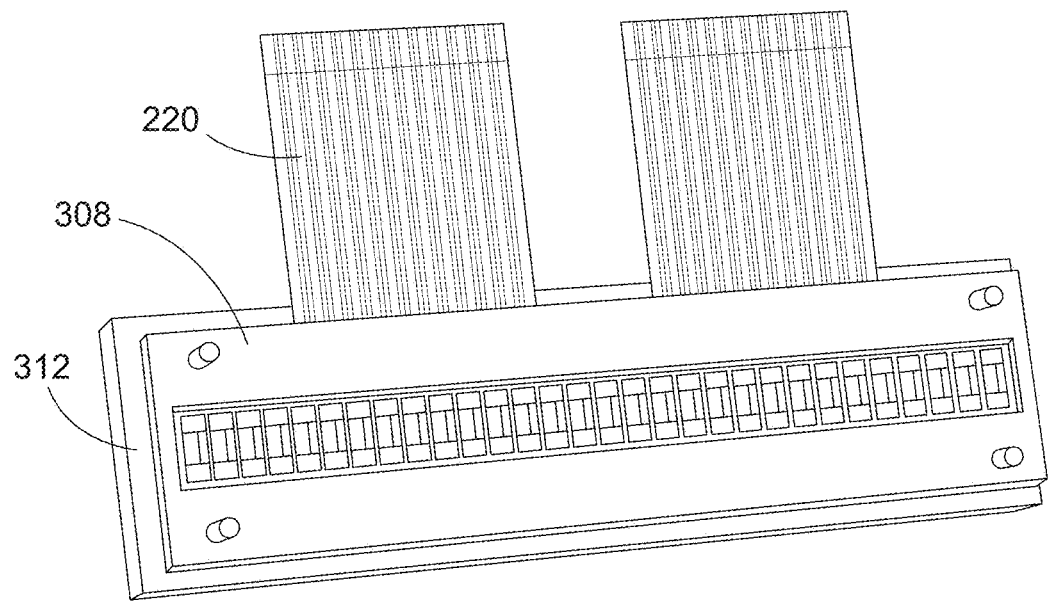
Figure 16B:
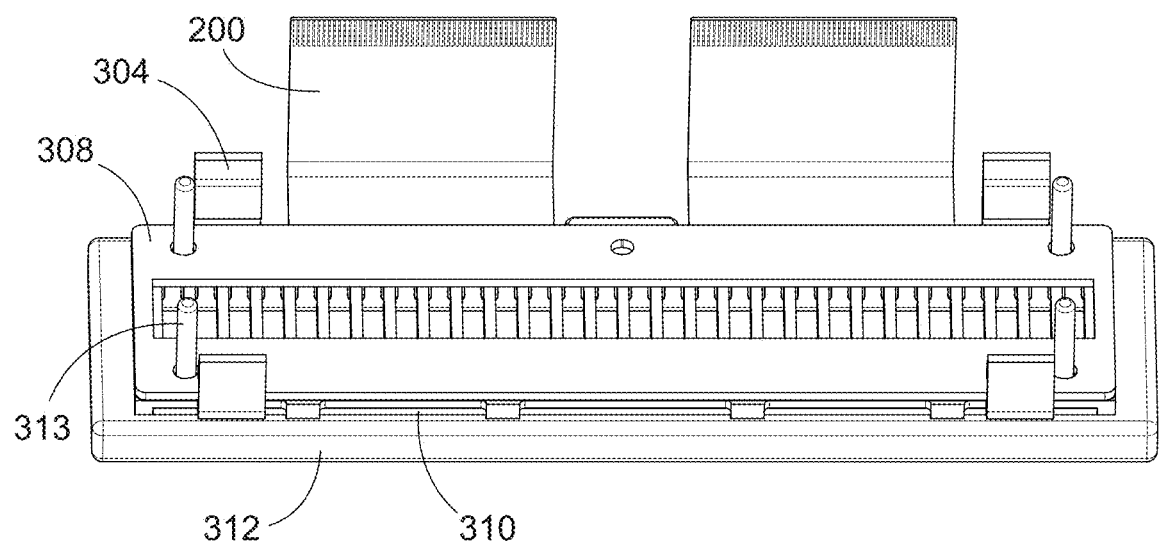
Figure 17:
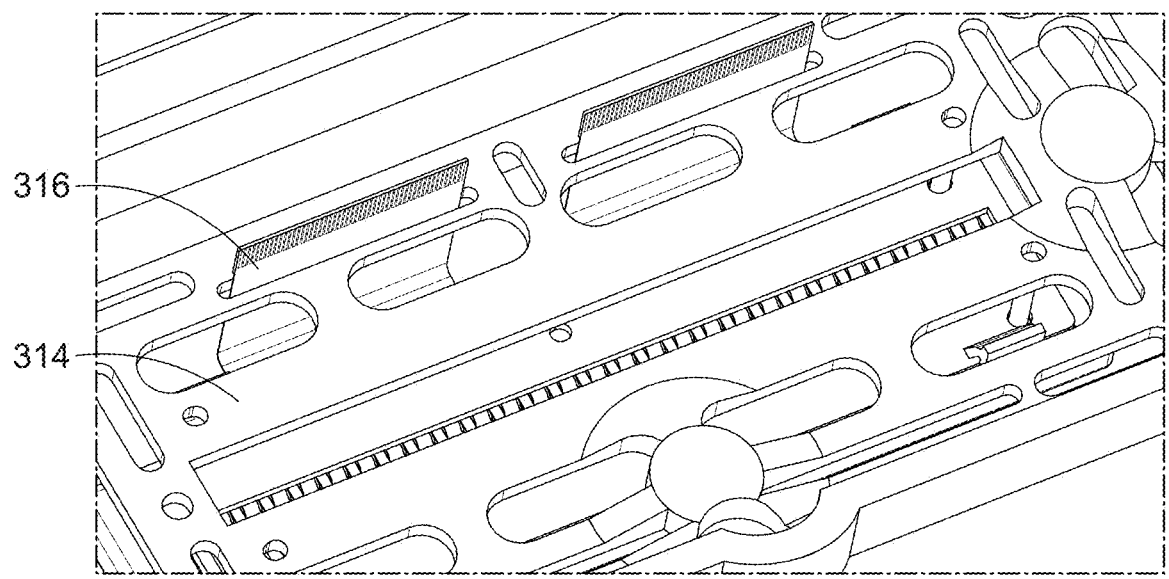
Figure 18:
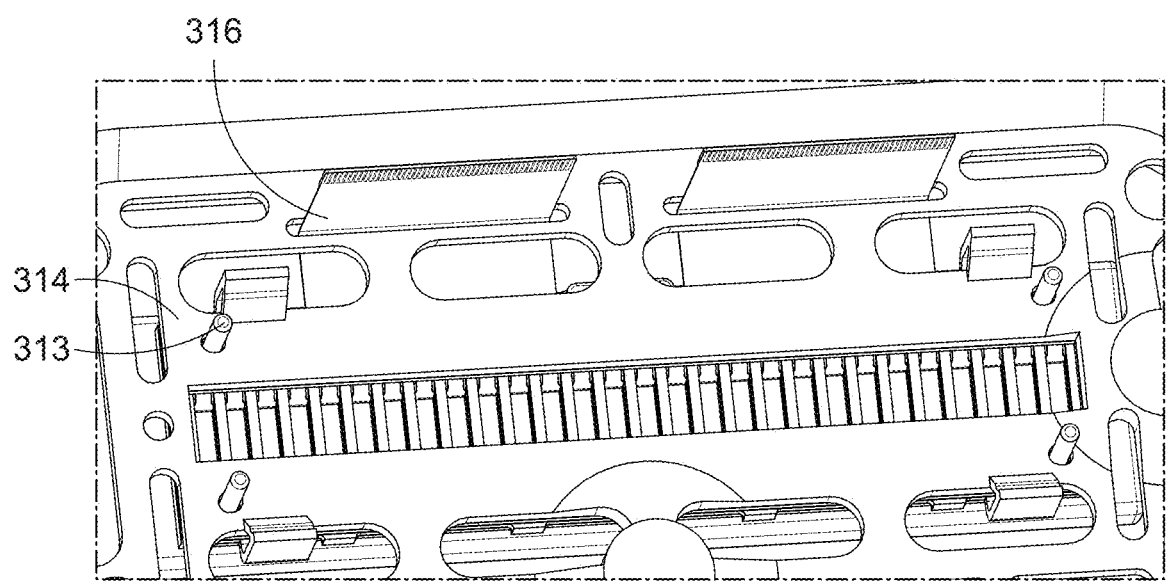
Figure 21A:
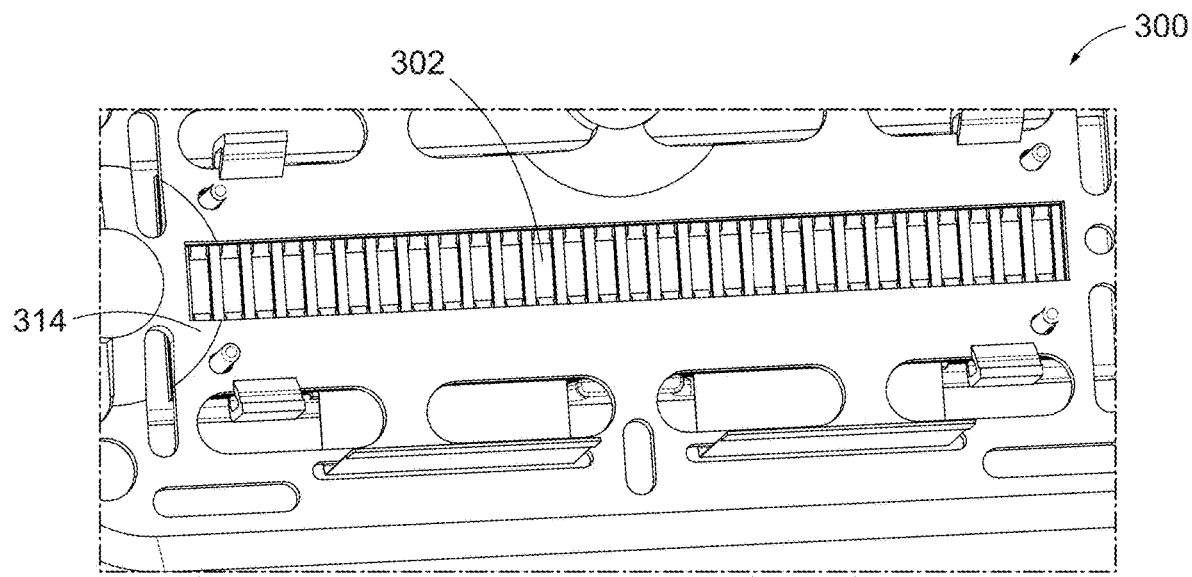
Figure 21B:
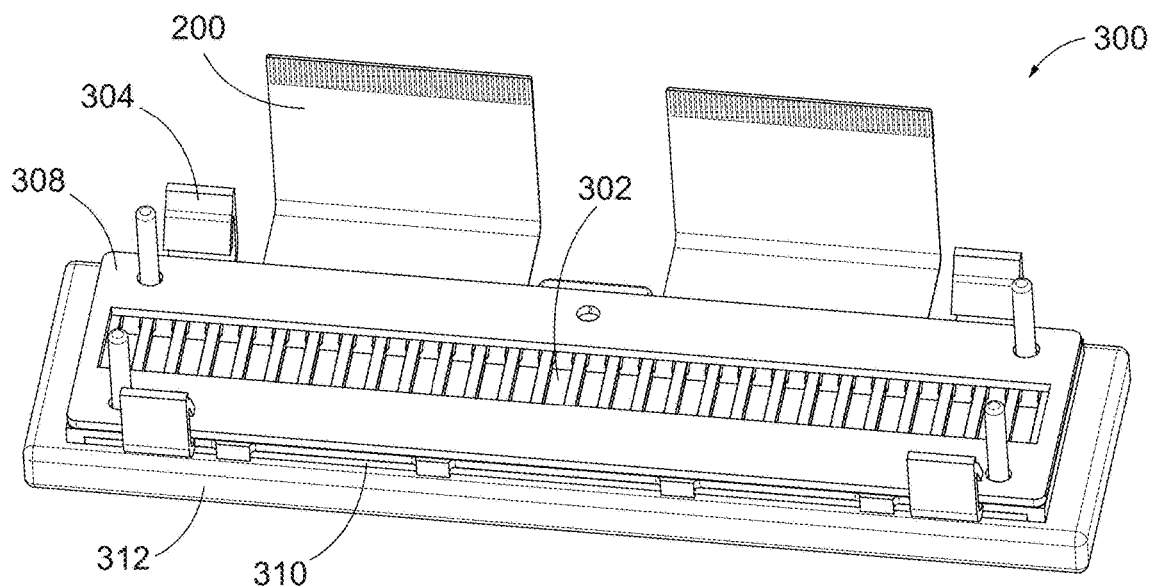
Figure 22:
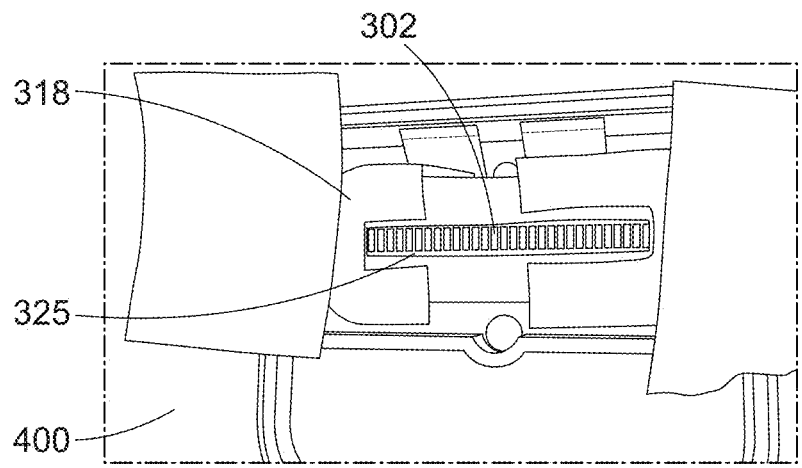
Figure 23:
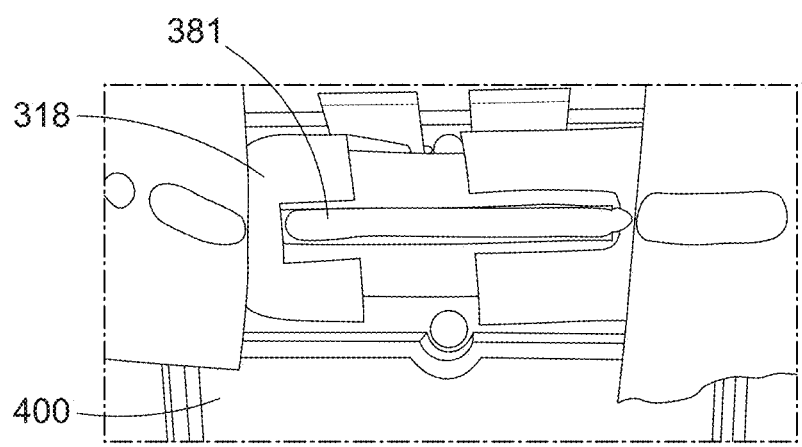
Figure 24:
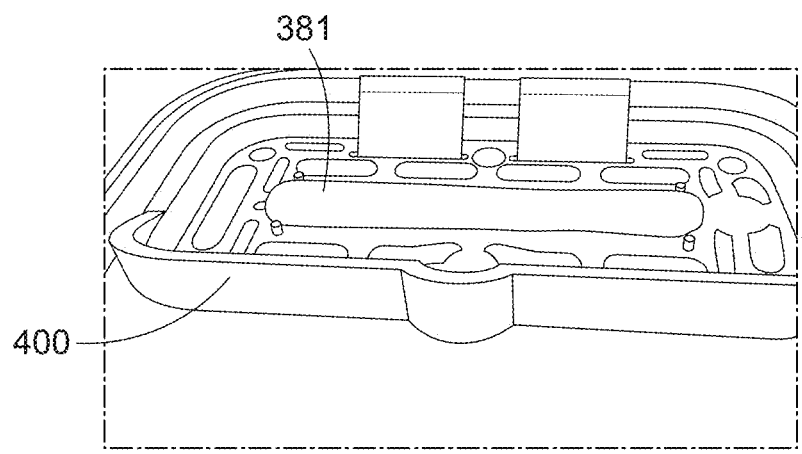
Figure 25:
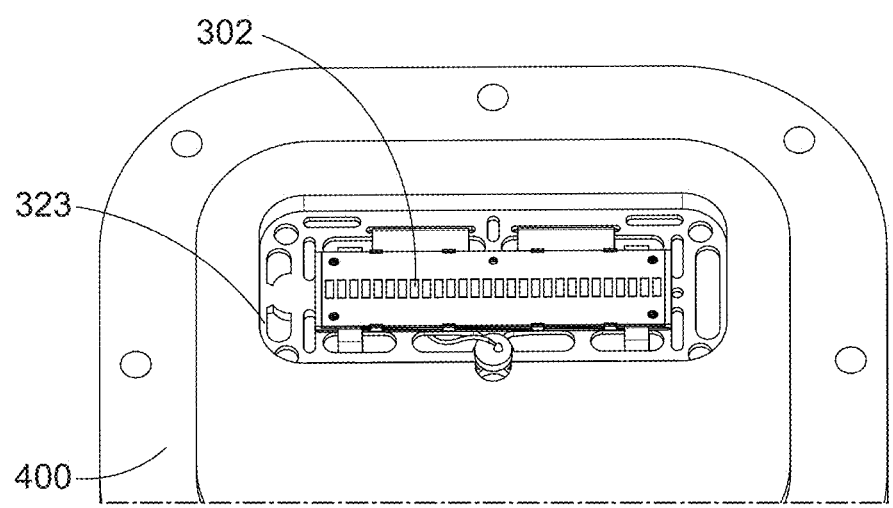
Figure 26:
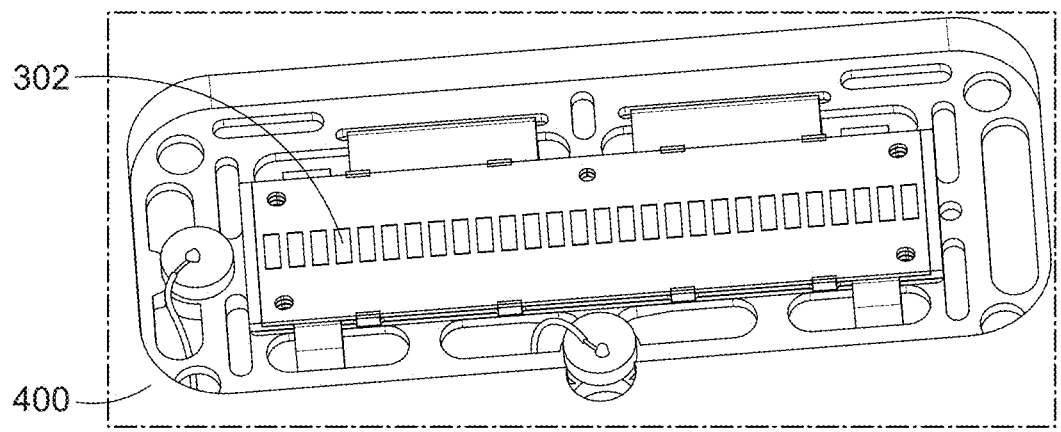
Figure 27:
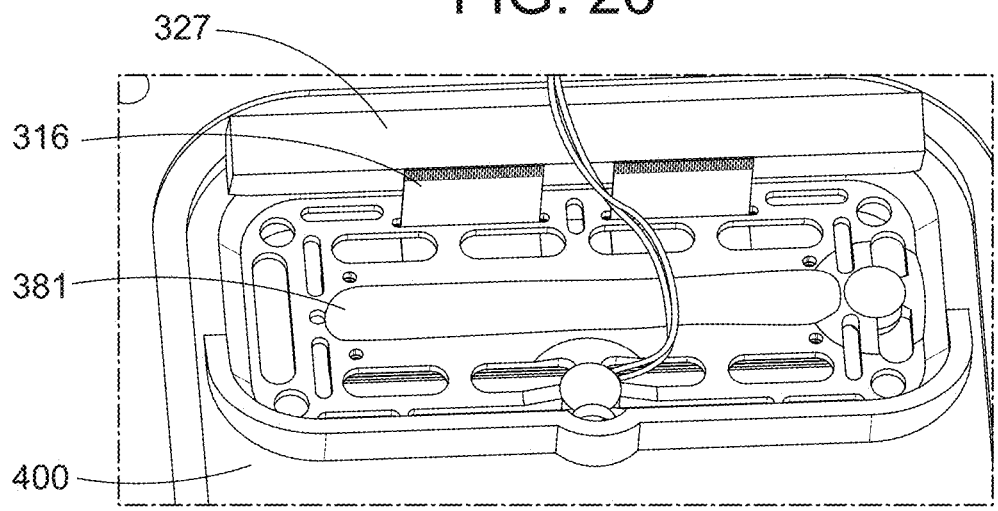
Figure 28:
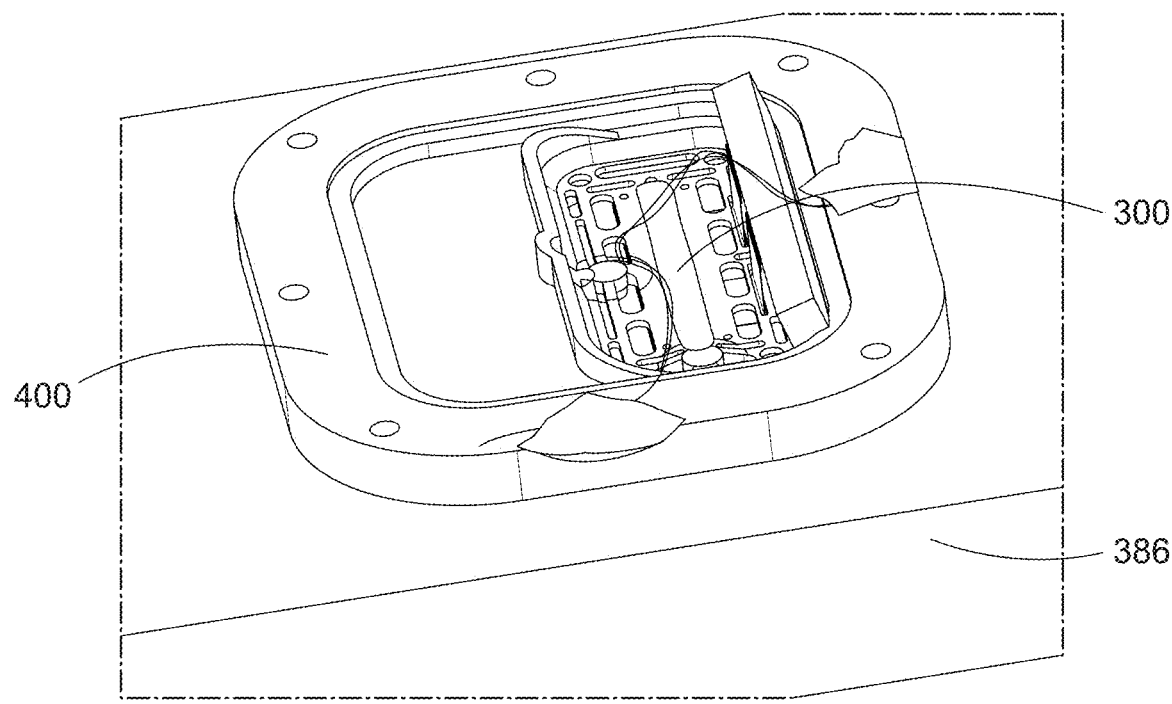
Figure 29:
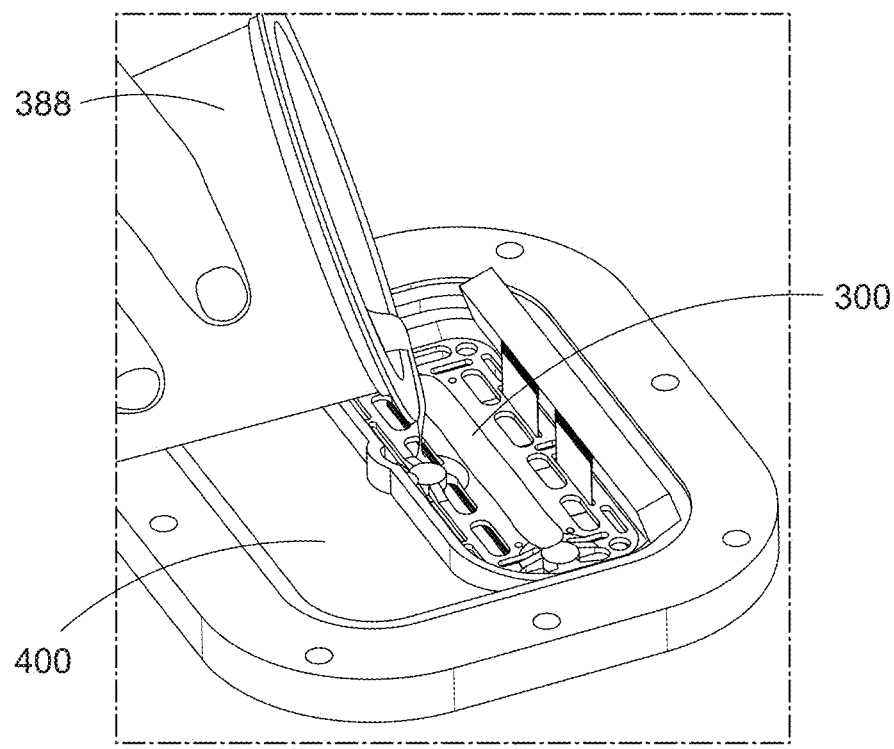
Figure 30:
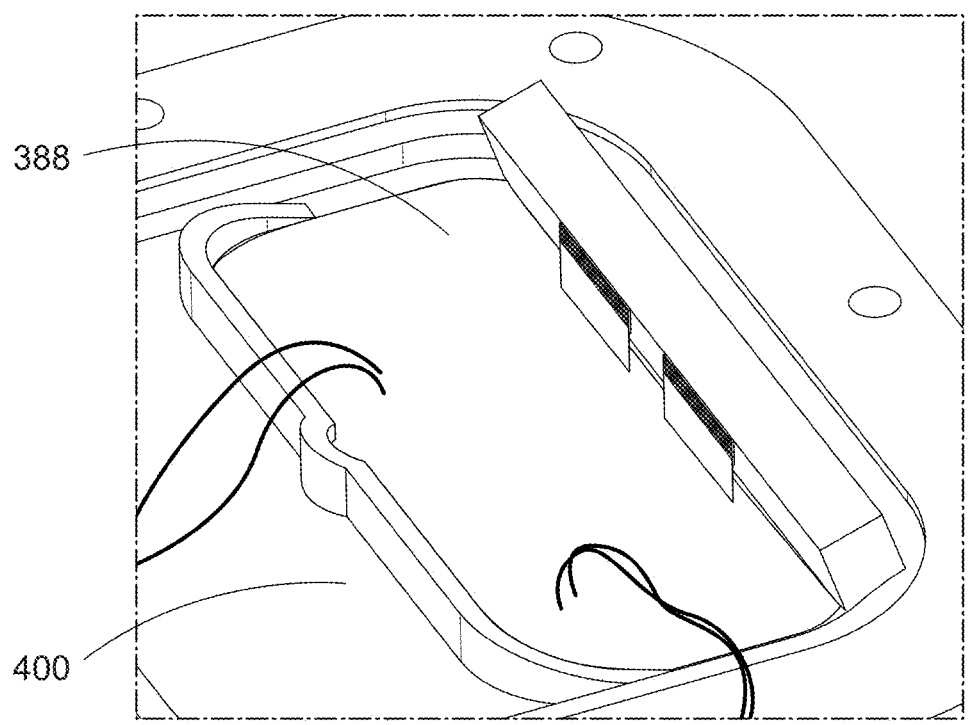
Figure 31:
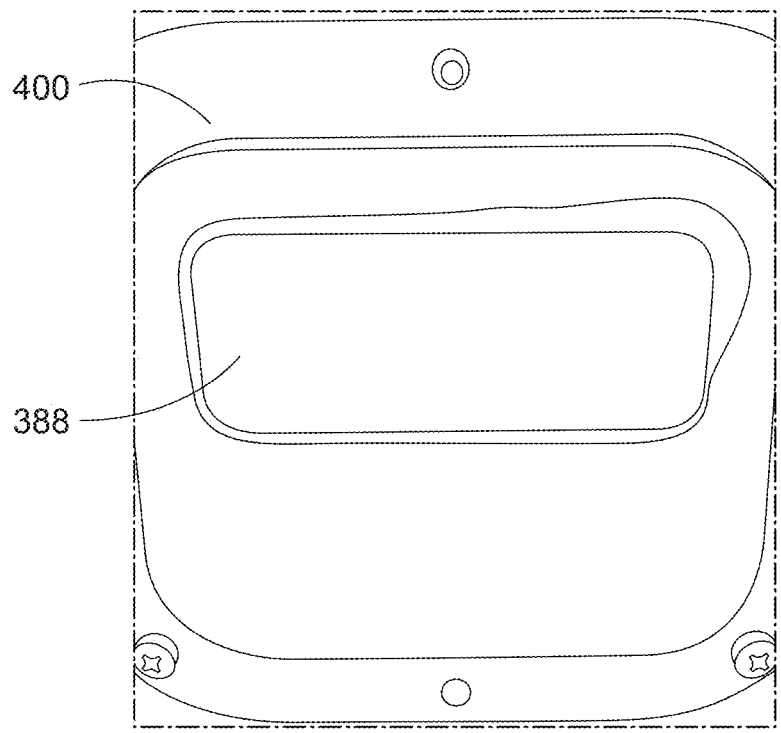

Having thus described the invention in general terms, reference will now be made to the accompanying drawings, which are not necessarily drawn to scale, and wherein:

FIG. 1 illustrates an example transducer array;

FIG. 2A illustrates an example printed circuit board in accordance with some embodiments discussed herein;

FIGS. 2B and 2C illustrate an example transducer element and an example corresponding set of flex tabs of a printed circuit boards in accordance with some embodiments discussed herein;

FIG. 3 illustrates another example printed circuit board in accordance with some embodiments discussed herein;

FIGS. 4A-4C illustrate example installation of a transducer element into a printed circuit board with flex tabs in accordance with some example embodiments discussed herein;

FIG. 5 illustrates a perspective view of an example transducer assembly in accordance with some example embodiments discussed herein;

FIG. 6 illustrates a cross sectional view of the example transducer assembly shown in FIG. 5, in accordance with some example embodiments discussed herein;

FIG. 7 illustrates an exploded view of a portion of an example transducer assembly in accordance with some example embodiments discussed herein;

FIGS. 8 and 9 illustrate exploded views of an example transducer assembly in accordance with some example embodiments discussed herein;

FIG. 10 illustrates an example transducer assembly positioned within a transducer assembly housing in accordance with some example embodiments discussed herein;

FIGS. 11A and 11B illustrate a flow chart of an example method of assembling an example transducer assembly in accordance with some example embodiments discussed herein;

FIGS. 12A and 12B illustrate example base foams and middle foams including apertures in accordance with some example embodiments discussed herein;

FIGS. 13A and 13B illustrate example installations of a base foam on an assembly fixture in accordance with some example embodiments discussed herein;

FIG. 14A illustrates an example installation of a base foam, a middle foam, and a PCB on an assembly fixture in accordance with some example embodiments discussed herein;

FIGS. 14B and 14C illustrate example installations of a base foam, a middle foam, a crystal chassis, and PCB on an assembly fixture in accordance with some example embodiments discussed herein;

FIGS. 15A and 15B illustrate example top foams including apertures in accordance with some example embodiments discussed herein;

FIGS. 16A and 16B illustrate example installations of top foam on an assembly fixture in accordance with some example embodiments discussed herein;

FIG. 17 illustrates example insertion and alignment of a flex tail of the PCB with a chassis front in accordance with some example embodiments discussed herein;

FIG. 18 illustrates example installation of the chassis front on an assembly fixture in accordance with some example embodiments discussed herein;

FIG. 19 illustrates example transducer elements on an adhesive strip in accordance with some example embodiments discussed herein;

FIGS. 20A and 20B illustrate an example installation of a transducer element into an aperture in accordance with some example embodiments discussed herein;

FIGS. 21A and 21B illustrate an example transducer assembly with the transducer elements installed in accordance with some example embodiments discussed herein;

FIG. 22 illustrates example installation of guard material about an aperture in a top foam in accordance with some example embodiments discussed herein;

FIG. 23 illustrates an example pouring of expansion foam into an aperture in a top foam in accordance with some example embodiments discussed herein;

FIG. 24 illustrates an example full expansion of the expansion foam in accordance with some example embodiments discussed herein;

FIG. 25 illustrates an example transducer assembly removed from an assembly fixture in accordance with some example embodiments discussed herein;

FIG. 26 illustrates an example transducer assembly with a release film removed in accordance with some example embodiments discussed herein;

FIG. 27 illustrates an example flex tail positioner installed on a transducer assembly in accordance with some example embodiments discussed herein;

FIG. 28 illustrates an example transducer assembly positioned at a predetermined tilt angle in accordance with some example embodiments discussed herein;

FIG. 29 illustrates an example potting material being poured over a transducer assembly in accordance with some example embodiments discussed herein;

FIG. 30 illustrates an example transducer assembly including potting material in accordance with some example embodiments discussed herein; and FIG. 31 illustrates an example emitting face of an assembled transducer assembly in accordance with some example embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

FIG. 1 illustrates an example transducer assembly 100. The transducer assembly 100 may include a printed circuit board (PCB) 102 and a plurality of transducer elements 104 arranged in an array. Each of the transducer elements 104 may be a piezoelectric crystal that is surface mounted to the PCB 102. In some embodiments, each of the transducer elements 104 may be directly affixed to the PCB 102, such as by a solder joint 106. The transducer elements 104 may each have one or more conductive surfaces, such as at each end of the transducer element. The conductive surface of the transducer element may be soldered to a conductive pad disposed on the surface of the PCB 102.

In some cases, the solder joints 106 may cause non-uniformity of the mechanical boundary conditions at the electrical contacts for each transducer element 104 of the transducer array 100. For example, the non-uniformity may be caused by the adhesion of the solder to the transducer element 104 and/or the conductive surface on the PCB 102, variations in the amount of solder material in the solder joint 106, variations in the distribution of the solder material in the solder joint 106, impurities in the solder joint 106, or the like. In some cases, affixing the transducer elements 104 to a face of the PCB 102 may enable translation, or transfer, of resonate vibrations of the transducer elements 104 to the PCB 102 causing an elastic response, e.g. resonance waves 108. For example, formed resonance waves 108 may propagate across a substrate of the PCB 102 and reflect off one or more edges, or boundaries, of the substrate, thereby causing further elastic response, e.g. reflection waves. The resonance waves 108 and associated reflections may cause vibrations in the transducer elements 104, which may ultimately form undesirable signals, e.g. interference, in the sonar signals.

In some cases, the PCB 102 may include a first layer PCB and a second layer PCB. The first layer of the PCB 102 may be disposed on a first side of the transducer element and the second layer of the PCB may be disposed on the second side of the transducer element. Each of the first layer and second layer of the PCB 102 may include a conductive pad, such that the transducer element 104 is connected at a first end to the conductive pad of the first layer of the PCB 102 and connected at a second end to a conductive pad of the second layer of the PCB 102. In such a manner, the transducer element(s) may be "sandwiched" between the first layer and second layer of the PCB 102. Such a two layer assembly may result in some reduction of the translation of the elastic response, e.g. resonate vibrations of the transducer elements 104. However, the solder joints 106 or other methods of affixing of the transducer elements 104 to the PCB 102 may also have significant translation of resonate vibrations therebetween.

Some embodiments of the present invention contemplate various transducer assemblies that reduce the variations in mechanical boundary conditions within the transducer assembly, such as may be formed based on the mechanical connections between the transducer elements and a PCB, thereby reducing element-to-element variations across the transducer assembly and, in some cases, increasing the sharpness of the sonar image. In some embodiments, example transducer assemblies described herein may also reduce translation of the resonate vibration of the transducer elements to the substrate of the PCB, thereby mitigating or eradicating interference from the elastic response of the PCB.

FIGS. 2A and 3 each illustrate an example printed circuit board (PCB) 200 in accordance with some embodiments discussed herein. The PCB 200 may include a flexible substrate 201, such as a Mylar film or other suitable material, and two or more conductive traces 204, such as copper traces or other suitable conductive material. The flexible substrate 201 may encapsulate the conductive traces 204, with the exception of contact pads 205 as discussed below, providing electrical insulation to the conductive traces 204. The body of the PCB 200 may be defined as the portion of the PCB 200 including electrical connections and circuit components other than the off board circuit traces.

The conductive traces 204 may be connected at one end to a flexible element tab, e.g. flex tab 202. In some embodiments, a contact pad 205 may be formed on the flex tab 202 and configured to interact with an end of the transducer element (such as described herein). In some such embodiments, the conductive traces 204 may be connected to the contact pads 205, such as to ultimately be electrically connected to an installed transducer element. In some embodiments, the contact pads 205 may be electrically conductive. Additionally or alternatively, conductive traces 204 may pass through the contact pads 205 so as to be electrically connected to an installed transducer element.

The flex tabs 202 may be attached at one or more ends (e.g., end 294) to a body 201 of the PCB 200 that defines a PCB plane. Additionally, one or more other ends or sides (e.g., sides 291, 292 and end 293) may be unattached to a body of the PCB 200 for at least a portion of the periphery of the flex tab 202 thereby enabling flex tabs 202 to flex, e.g. bend, outwardly from a PCB plane defined by the body of the PCB 200. In some embodiments, one end 293 and sides 291, 292 of the flex tabs 202 may be dye cut, laser cut, or otherwise detached from the body of the PCB 200. The flexible substrate a 201 and conductive traces 204 may bend or flex at the junction of the attached side 294 of the flex tab 202 and the body of the PCB 200.

The conductive pads 205 of the flex tabs 202 may be formed of any suitable conductive material of high conductance, such as gold, silver, copper, non-metallic conductors, or the like. The conductive pads 205 may be formed of the same material as the conductive traces 204, such as by acid etching or other suitable method. The conductive pads 205 may be an extension of the conductive traces 204 that are not covered by the flexible substrate 201, such that the conductive pads 205 may be in direct contact with an end of a transducer element 302, such as illustrated conceptually in FIG. 2B.

In an example embodiment, with reference to FIG. 2B, the flex tabs 202 may be disposed as a flex tab pair including a first flex tab 202A and a second flex tab 202B. The flex tab pair 202A, 202B may have attached ends 294 disposed at a far end from the unattached end 293, such that when the flex tabs 202 flex out of the PCB plane. In some embodiments, the flex tab pair 202A, 202B are configured to flex away from each other. The transducer element 302 may be inserted, or installed into an opening 299 created by flexion of the flex tabs 202A, 202B outwardly from the PCB plane. The transducer element 302 may include a first conductive element (e.g., portion) 350A disposed at a first end of the transducer element 302 and a second conductive element (e.g., portion) 350B disposed at a second end of the transducer element 302 (in some embodiments, the entire or different portions of the transducer element may be conductive). When installed into the PCB 200 (such as illustrated in FIGS. 4A-4C) flexion of the flex tab pair 202A, 202B causes the first flex tab 202A to generate a reactionary elastic force in the direction of the second flex tab 202B and the second flex tab 202B to generate a reactionary elastic force in the direction of the first flex tab 202A. The elastic force may cause the first conductive pad 205A of the first flex tab 202A to contact the first conductive element 350A of the transducer element 302 and the second conductive pad 205B of the second flex tab 202B to contact the second conductive element 350B of the transducer element 302. The contact between the first conductive pad 205A with the first conductive element 350A and the second conductive pad 205B with the second conductive element 350B may create an electrical path across the flex tab pair 202A, 202B and the transducer element 302.

In some embodiments, one or more of the contact pads 205 on the flex tabs 202 may include a point contact 207. For example, with reference to FIG. 2C, a first point contact 207A is disposed on the first flex tab 202A and a second point contact 207B is disposed on the second flex tab 202B. The point contacts may each extend outwardly away from the corresponding flex tab 202 toward the transducer element 302, when installed in the PCB 200, such as depicted in FIGS. 2A and 2C. In an example embodiment, the point contacts may be a set of dimples. The dimples may be formed on the contact pad 205 by warping the substrate 201 and contact pad 205, such as by applying force to a dye in contact with the contact pad 205. Alternatively, the point contacts 207 may be formed by adding a predetermined amount of conductive material, e.g. solder, to a portion of the conductive pad 205. In some embodiments, the predetermined amount of conductive material may have a precise mass load for each application to ensure uniformity.

As described in further detail below, a transducer element 302 may be installed in a direction perpendicular to the PCB plane causing the flex tabs 202 to flex (e.g., in some cases, further flex) outwardly from the PCB plane. The flexion of the flex tabs 202 may cause an elastic force of the flex tabs 202 to be applied against opposing ends of the transducer elements 302. The point contact 207 on the conductive pad 205 of the flex tab 202 may increase the pressure applied by the flex tabs 202 by reducing the contact area between the conductive ends 350 of the transducer elements 302 and the conductive pads 205 of the flex tabs 202. More particularly, when installed into the PCB 200, flexion of the flex tab pair 202A, 202B causes the first flex tab 202A to generate a reactionary elastic force in the direction of the second flex tab 202B and the second flex tab 202B to generate a reactionary elastic force in the direction of the first flex tab 202A. The elastic force may cause the first point contact 207A of the first conductive pad 205A of the first flex tab 202A to contact the first conductive element 350A of the transducer element 302 and the second point contact 207B of the second conductive pad 205B of the second flex tab 202B to contact the second conductive element 350B of the transducer element 302. The contact between the first conductive pad 205A with the first conductive element 350A (e.g., through the first point contact 207A) and the second conductive pad 205B with the second conductive element 350B (e.g., through the second point contact 207B) may create an electrical path across the flex tab pair 202A, 202B and the transducer element 302.

In some embodiments, with reference to FIG. 3, the PCB 200 may include one or more alignment apertures 206 configured to aid in alignment of the PCB 200 during assembly of the transducer assembly and/or receive one or more fasteners, such as screws, to mount the PCB to another component of the transducers assembly.

FIGS. 4A-4C illustrate example insertion of a transducer element 302 into a PCB 200 with flex tabs 202 in accordance with some example embodiments of a transducer assembly 300 discussed herein. Each of the transducer elements 302 may be a piezoelectric crystal, such as a length-poled piezoelectric crystal, configured to emit sound waves when excited by an electrical signal and/or emit an electrical signal when excited by a vibration, such as a sound wave. The transducer elements 302 may include conductive elements 350 disposed on opposing ends of the transducer elements 302, as discussed above in reference to FIGS. 2B and 2C. The conductive elements 350 may be formed by any suitably high conductance material, such as gold, silver, copper, non-metallic conductors, or the like.

The transducer assembly 300 may include one or more support structures 304. The support structure 304 may include an aperture 322 configured to receive at least a portion of the transducer element 302. Additionally, the support structure 304 may also be configured to support the body of the PCB 200 while allowing flexion of the flex tabs 202 into the aperture 322.

The PCB 200 may be aligned and/or mounted to the support structure 304. The transducer element 302 may be press fit into the aperture 322 of the support structure 302 causing the flex tabs 202 to flex outwardly from the PCB plane 203 into the aperture 322. Flexion of the flex tabs 202 cause a reactionary elastic force to be applied to the conductive elements 350 disposed at the ends of the transducer elements 302. With the transducer elements 302 installed, the flex tabs 202 may be approximately perpendicular, e.g. 90 degrees from, the body of the PCB 200. In some embodiments, the mounting of the transducer element 302 into the support structure 304 and/or PCB 200 may be through an interference fit.

The flexion or bend in the flex tab 202 may prevent or limits resonate vibration translated from the transducer elements 302 to the flex tabs from propagating across the body of the PCB 200 as resonance waves, thus also preventing or limiting reflected waves. The reduction or elimination of the resonance waves may be caused by a resistance, or inefficacy, of the resonate vibration to shift mode approximately 90 degrees from the flex tab 202 to the body of the PCB 200. Additionally, in some embodiments, since each transducer element 302 is installed between a separate set of flex tabs 202, the resistance to propagation of the resonate vibration from the flex tabs 202 to the body of the PCB 200 may also prevent vibrations caused by one transducer element 302 from reaching a second transducer element. This reduction in the elastic response, e.g. resonance waves and reflected waves, may significantly reduce undesirable signals, e.g. interference, that may otherwise effect the sonar image.

In some embodiments, the translation of the resonate vibration, e.g. resonance waves, may be further reduced by the electrical connection between the transducer elements 302 and the conductive pads 205 of the PCB 200. In this regard, since the electrical connection is made by contact between the conductive pads 205 of the PCB 200 and the conductive elements 350 on the transducer elements 302 caused by the elastic force, solder or other fixation of the transducer elements 302 to the PCB 200 is not necessary. The lack of direct mechanical connection, such as the solder joint 106 of the prior art, may significantly reduce translation of the resonate vibrations to the PCB 200. Another advantage of the lack of solder joints is the removal of variations in mechanical boundary conditions of the electrical connections caused by the solder joint, which may result in a sharper sonar image due to clearer and/or stronger signals to and from the transducer elements 302.

FIG. 5 illustrates a perspective view of an example transducer assembly 300 in accordance with some example embodiments discussed herein. The transducer assembly 300 may include a plurality of transducer elements 302 inserted or mounted into the PCB 200 between flex tabs 202. The transducer assembly 300 may be assembled and aligned by an assembly fixture 312, as discussed below in reference to FIGS. 11-31. FIG. 6 illustrates a cross sectional view of a transducer assembly 300 in accordance with some example embodiments discussed herein. The transducer assembly may include a base foam 310, a support structure 304 middle foam 306, PCB 200, a top foam 308, and a plurality of transducer elements 302. The interaction of the various components of the transducer assembly 300 are discussed below in reference to FIGS. 7-10.

FIG. 7 illustrates an exploded view of a portion of the transducer assembly 300 in accordance with some example embodiments discussed herein. The transducer assembly 300 may include a middle foam 306, e.g. a flex foam, in addition to the support structure 304 (shown in FIG. 8). The middle foam 306 may include an aperture 321 (depicted in FIG. 9) to receive the transducer elements 302 and the flex tabs 202 of the PCB 200. In some example embodiments, the middle (or other) foam may serve as the support structure supporting the body of the PCB 200 and the support structure 304 may not be provided.

The middle foam 306 may be any nonconductive material with a high elasticity and low creep, such as closed cell foam, rubber, or the like. The middle foam 306 may have separate apertures 321 for each transducer element 302, to provide individual enclosures for each transducer element 302. In some embodiments, the aperture 321 may be smaller than or the same size as the transducer elements 302 in the longitudinal direction of extension, such that when the flex tabs 202 flex into the aperture 321 and contact the edge of the aperture, the foam resists the flexion of the flex tabs 202. The resistance to the flexion of the flex tabs 202 may cause an increase in force (e.g., a resistance force) to be applied by the flex tabs 202 to the conductive elements 350 at the ends of the transducer elements 302.

In some embodiments, the apertures 321 may be formed by an H cut, such that the middle foam 306 includes a plurality of foam tabs 305 configured to flex outwardly from a foam plane 307 defined by the body of the middle foam. The foam tabs 305 may flex with the flex tabs 202 into the aperture 322 (depicted in FIG. 9) in the support structure 304 and/or the base foam 310. Flexion of the foam tabs 305 may cause an elastic force to be applied to the flex tabs 202, thereby causing an increase in the total force applied by the flex tabs 202 to the ends of the transducer elements 302.

FIGS. 8 and 9 illustrate exploded views of the transducer assembly 300 in accordance with some example embodiments discussed herein. In some example embodiments, the assembly fixture 312 may include one or more guide posts 313 or ribs which may be received through one or more guide holes 315 or notches disposed in the top foam 308, middle foam 306, support structure 304, and/or the base foam 310. The one or more guide posts 313 may be further received through one or more guide holes 206 of the PCB 200. The guide posts 313 may be metal, plastic, or other suitably rigid material. The guide posts 315 may project upward and away from an assembly face of the assembly fixture 312. The guide post 313 and guide holes 315, 206 may align the components of the transducer assembly 300 during assembly. In some embodiments, the guide holes 315, 206 may also be used to mount and/or align the transducer assembly 300 in a housing, such as the transducer assembly housing 400 illustrated in FIG. 10. Additionally or alternatively, the transducer assembly housing 400 or other close tolerance container may be utilized to align the various components of the transducer assembly 300 during the assembly process, such as described below in reference to FIGS. 11A-31.

The transducer assembly 300 may include a top foam 308 and a base foam 310 disposed on opposing faces of the middle foam 306 (e.g., the top foam 308 and base foam 310 may "sandwich" the middle foam 306). The top foam 308, middle foam 306, and base foam 310 may absorb sound waves which are not aligned with the acoustic, e.g. emitting face, of the transducer elements 302 of the transducer assembly 300. Additionally, the top foam 308, middle foam 306, and/or the base foam 310 may dampen radiative sound waves produced by vibration of the transducer elements 302. The base foam 310 may include a plurality of apertures 324 corresponding to each to the transducer elements 302 to provide an unobstructed path for emitted and received sound waves to the acoustic face of the transducer assembly 300. Additionally, as discussed above, the apertures 324 in the base foam 310 may receive a portion of the flex tabs 202 and/or the foam tabs 305 when they are flexed outwardly from the PCB plane 203 and foam plane 307 (shown in FIG. 7), respectively.

The support structure 304, e.g. crystal chassis, may be formed of plastic, rubber, or other suitable ridged, or semi-rigid material (although, in some embodiments, the term "support structure" may refer to one or more foam layers, such as may be used to replace a rigid support structure). The support structure 304 may include a single aperture 322 or a plurality of apertures to receive the individual transducer elements 302. The support structure 304 may include a single aperture 322 in an embodiment including a middle foam 308 or other component providing lateral separation of the transducer elements 302, to prevent undesirable signals, e.g. interference, caused by contact between vibrating piezoelectric crystals. The support structure 304 may be disposed between the base foam 310 and the middle foam 306, and the PCB 200 may be disposed between the support structure 304 and the top foam 308.

In some example embodiments, the support structure may include one or more retention clips 329. The retention clips 329 may project away from the surface of the support structure 304. The retention clips 329 may be configured to receive and retain a chassis front 314 (FIG. 20B) in a predetermined position. The top foam 308, PCB 200, and middle foam 306 may be "sandwiched" between the support structure 304 and the chassis front 314, which may cause a force to be applied between the middle foam 306, PCB 200, and top foam 308, thereby limiting or preventing voids therebetween.

The top foam 308 may include an aperture 325 configured to receive an expansion foam. The aperture 325 may extend in a longitudinal direction of extension of the top foam 308. The aperture 325 may expose the transducer elements 302 when the transducer assembly 300 is assembled. The expansion foam may be poured through the aperture 325 around the transducer elements and into the apertures 320 of the PCB 200, the aperture 321 of the middle foam 306, the aperture 322 of the support structure 304, and the aperture 324 of the base foam 310—filling voids between the components. The expansion foam may harden to affix or "lock" the position of the transducer elements 302 relative to the other components of the transducer assembly 300. Notably, however, the expansion foam does not mechanically affix the transducer element to the PCB 200 or any other component of the transducer assembly 300.

FIG. 10 illustrates the transducer assembly 300 within a transducer assembly housing 400 in accordance with some example embodiments discussed herein. The transducer assembly 300 may be assembled and installed into the transducer assembly housing 400, such as described below. The transducer assembly housing 400 may provide structural support and protection of the transducer assembly 300 in a marine environment. In some embodiments, the transducer assembly housing 400 may be watertight, shock resistant, or the like. The transducer assembly housing 400 may be configured to house one or more transducer assemblies 300 and/or one or more sensors, such as position sensors, temperature sensors, water flow sensors, acoustic sensors, or the like.

FIGS. 11A and 11B illustrate a flow chart of a method of assembling the transducer assembly in accordance with some example embodiments discussed herein. In some embodiments, the method may include additional, optional operations, and/or the operations described below may be modified or augmented. In an example embodiment, the method may include installing a release film onto the fixture assembly 312 at operation 502. The release film may be a polyurethane sheet, or other suitable material, which may enable the expansion foam or other materials to be set within the transducer assembly without adhesion to the assembly fixture 312. Additionally, the release film may be removed relatively easily, such as by peeling, from the transducer assembly 300 (e.g., after the transducer assembly 300 is removed from the assembly fixture 312).

The method may include cutting flex holes, e.g. apertures 324, into the base foam 310 at operation 504 and cutting flex holes, e.g. apertures 321, into the middle foam 306 at operation 506. As depicted in FIGS. 12A and 12B, the number and arrangement of the apertures 321, 324 may correspond to the number and arrangement of the transducer elements 302. The apertures 321 of the middle foam 306 and/or apertures 324 of the base foam 310 may be cut in an H pattern, e.g. H cut, thereby forming foam tabs 305. The cuts may be executed by a dye, laser, knife, or other suitable cutting tool.

At operation 508, the base foam 310 may be mounted to the assembly fixture 312. As depicted in FIGS. 13A and 13B, guide holes 315 of the base foam may be fitted onto guide posts 313 of the assembly fixture 312. Additionally or alternatively, the transducer housing 400 or other close tolerance container may be utilized to align the various components of the transducer assembly 300 during the assembly process.

At operation 510, the crystal chassis, e.g. support structure 304, may be mounted to the assembly fixture 312. At operation 512, the middle foam 306 may be mounted to the assembly fixture 312. At operation 514, the flex PCB 200 may be mounted to the assembly fixture 312. Each of the support structure 304, middle foam 306, and PCB 200, may include guide holes 315, 206 that fit onto the guide posts 313. Additionally or alternatively, the support chassis 304 may include one or more alignment protrusions 311, depicted in FIG. 8, corresponding to one or more alignment recesses 309, depicted in FIG. 7. The alignment protrusions 311 and alignment recesses 309 may align the middle foam 306 on the support structure 304 such that the apertures 321 of the middle foam 306 are aligned with the aperture 322 of the support structure 304. Additionally, the alignment protrusions 311 and alignment recesses 309 may restrict lateral movement of the middle foam 306 with respect to the support structure 304. FIG. 14A illustrates an example embodiment in which the middle foam and PCB 200 have been mounted on the assembly fixture 312 and the middle foam serves as the support structure of the transducer assembly 300. FIG. 14B depicts an embodiment including the crystal chassis, e.g. support structure 304. The support structure 304 and middle foam 306 are mounted to the assembly fixture 312. FIG. 14C depicts the example embodiment of FIG. 14B where the PCB 200 is also mounted to the assembly fixture 312.

At operation 516, an expansion foam slot, e.g. aperture 325, may be cut into the top foam 308. As depicted in FIGS. 15A and 15B, the aperture 325 may be elongated in the longitudinal direction of extension of the top foam 308, such that, when assembled, the transducer elements 302 are not covered by the top foam 308, due to being exposed via the aperture 325. The cut may be executed by a dye, laser, knife, or other suitable cutting tool.

At operation 518, the top foam 308 may be mounted to the assembly fixture 312. As depicted in FIGS. 16A and 16B, the top foam 308 may be mounted to and/or aligned with the transducer assembly 300 by fitting guide holes 315 onto the guide posts 313.

At operation 520, flex tails 316, e.g. the off board connection portion of the PCB 200, may be inserted and aligned into a chassis front 314, as depicted in FIG. 17. The chassis front may be metal, ridged plastic, or the like, and be configured to restrain the middle foam 306, and top foam 308 with the support structure 304, e.g. the crystal chassis. At operation 522, the chassis front 314 may be mounted to the assembly fixture 312 via guide posts 313.

At operation 524, piezoelectric crystals (e.g., transducer elements 302) may be inserted into the flex circuit, e.g. PCB 200, by press fitting the transducer element 302 between the flex tabs 202 of the PCB 200, as depicted in FIG. 20A.

FIG. 19 illustrates a plurality of transducer elements 302 on an adhesive strip. In some example embodiments, the transducer elements 302 may be removed from the adhesive strip, such as by tweezers and inserted into the corresponding apertures 321 of the transducer assembly 300 between the flex tabs 202, such as be a push probe, as depicted in FIG. 20B.

Alternatively, two or more, such as all transducer elements 302 of the transducer assembly 300 may be installed simultaneously. In one such example, a machine with a multi-head arm may be fed a plurality of transducer elements 302, such as on the adhesive strip. The machine may align the plurality of transducer elements 302 with the apertures in the transducer assembly 300. The multi-head arm may be driven toward the transducer assembly 300, thereby pushing the plurality of transducer elements 302 into the corresponding apertures 321 between the flex tabs 202 of the PCB 200. FIGS. 21A and 21B illustrate the transducer assembly 300 with the transducer elements 302 installed.

At operation 526, expansion foam 381 may be provided into the expansion slot, e.g. aperture 325, such that the expansion foam 381 surrounds the transducer elements 302 and fills the cuts, e.g. apertures, in the base foam 310, middle foam 306, and at least a portion of the top foam 308. As depicted in FIG. 22, guard material 318 (such as paper, wax paper, polyurethane sheeting, or the like) may be installed around the aperture 325 in the top foam 308. The expansion foam 381 may be poured into, e.g. across, the aperture 325 in the top foam 308, as depicted in FIG. 23. Excess expansion foam 381 may be caught by the guard material 318, which may be removed subsequent to completion of pouring the expansion foam 381. In some embodiments, the expansion foam 381 may be poured with the transducer assembly 300 inserted into the transducer assembly housing 400, or one half of the transducer assembly housing 400 including a recess for the transducer assembly 300, such that the expansion foam 381 fills gaps present between the components of the transducer assembly 300 and the transducer assembly housing 400. Alternatively, a mold may be installed around a peripheral edge of the transducer assembly, which may become a portion of the transducer assembly 300, or may be removed after expansion of the expansion foam 381.

At operation 528, the expansion foam 381 may be allowed to expand. Full expansion of the expansion foam 381 may fill gaps between components of the transducer assembly 300 and/or lock the respective positions of the components of the transducer assembly 300 relative to each other. FIG. 24 depicts a "loaf" of fully expanded expansion foam 381.

At operation 530, the fixture assembly 312 may be removed from the transducer assembly 300. FIG. 25 illustrates a transducer assembly 300 with the assembly fixture 312 removed and the release sheet 323 visible At operation 534, the release film 323 may be removed from the transducer assembly 300, as depicted in FIG. 26. The release film 323 may be peeled or otherwise removed to expose the emitting face of the transducer elements 302.

At operation 536, the transducer assembly 300 may be installed into the transducer assembly housing 400, if not performed previously, such as in conjunction with operation 526.

At operation 538, a flex tail positioner 327 may be installed with respect to the transducer assembly housing 400. As depicted in FIG. 27, the flex tail positioner 327 may be installed between the flex tail 316 of the PCB 200 and the transducer assembly housing 400. The flex tail positioner 327 may cause the flex tail 316 to be directed in a direction substantially perpendicular to, e.g. outward and away from, the chassis front 314 and/or transducer assembly housing 400. Other electronic wires or cable may also be routed and secured to the transducer assembly housing 400, as appropriate.

At operation 540, the transducer assembly housing 400, including the transducer assembly 300, may be placed at a predetermined tilt angle. As depicted in FIG. 28, the transducer assembly housing 400 may be set on a tilt plate 386 set at the predetermined tilt angle, such as 5 degrees, 10 degrees, 15 degrees, or the like.

At operation 542, a urethane potting material may be provided over the transducer assembly 300. FIGS. 29 and 30 illustrate urethane 388 being poured into a portion of the transducer assembly housing 400, such that the transducer assembly 300 is completely enveloped by the potting material 388. In some embodiments, a release film may be applied to the emitting face of the transducer assembly 300 prior pouring the urethane 388.

At operation 544, the urethane 388 may be allowed to cure. FIG. 31 depicts the emitting face of the transducer assembly 300 in the transducer assembly housing 400 after the potting material 388 has cured and the release film has been removed. After completion of the assembly of the transducer assembly 300, in some embodiments, the transducer assembly housing 400 may be closed, such as by installation of a second half of the transducer assembly housing 400.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A sonar transducer assembly comprising:
   at least one transducer element;
   a flexible printed circuit board (PCB) comprising at least one set of electrical connections for the at least one transducer element, wherein the electrical connections comprise flex tabs configured to flex out of a PCB plane defined by a body of the PCB; and
   a support structure comprising at least one aperture for the at least one transducer element, wherein the support structure is configured to:
   support the body of the PCB;
   allow flexion of the flex tabs into the aperture; and
   retain the at least one transducer element in the at least one aperture,
   wherein the transducer element is installed into the aperture in a direction that is perpendicular to the PCB plane causing the flex tabs to flex outwardly from the PCB plane, wherein the flexion of the flex tabs causes an elastic force of the flex tabs to be applied against opposing ends of the at least one transducer element.

2. The sonar transducer assembly of claim 1, wherein the at least one transducer element is not affixed to the PCB.

3. The sonar transducer assembly of claim 1, wherein the at least one set of electrical connections further comprise point contacts extending outwardly from the flex tabs toward the at least one transducer element to increase pressure applied by the flex tabs on the at least one transducer element.

4. The sonar transducer assembly of claim 3, wherein the point contacts each comprise a dimple in a contact pad or an electrically conductive material added to a contact pad.

5. The sonar transducer assembly of claim 1, wherein the at least one transducer element comprises a plurality of transducer elements and the at least one aperture comprises a plurality of apertures, wherein each of the plurality of transducer elements is disposed in a separate one of the plurality of apertures, wherein the support structure and PCB provide resonance isolation for each of the plurality of transducer elements.

6. The sonar transducer assembly of claim 1, wherein the support structure comprises foam.

7. The sonar transducer assembly of claim 6, wherein the foam provides resistance to the flexion of the flex tabs to cause an increase in the elastic force applied to the opposing ends of the at least one transducer element.

8. The sonar transducer assembly of claim 6, wherein the aperture comprises an H cut configured to enable a foam tab to flex out of a foam plane defined by a foam body.

9. The sonar transducer assembly of claim 6, wherein the support structure further comprises a base foam disposed on a first side of the foam and a top foam disposed on a second side of the foam.

10. The sonar transducer assembly of claim 9, wherein the top foam includes a slot cut configured to receive expanding foam therethrough.

11. The sonar transducer assembly of claim 9, wherein the base foam includes an element aperture for the at least one transducer element, wherein the element aperture is configured to receive at least a portion of the flex tabs or a portion of the foam when the flex tabs are flexed.

12. The sonar transducer assembly of claim 1, wherein the support structure comprises a chassis formed from a rigid structural material.

13. The sonar transducer assembly of claim 1, wherein at least a portion of the transducer assembly is filled with an expanding foam that is configured to retain the relative position of the at least one transducer element with respect to the support structure and the PCB.

14. The sonar transducer assembly of claim 1 further comprising:
   a housing configured to enclose the at least one transducer element, the support structure, and the PCB within a watertight volume; and
   wherein at least a portion of the housing that encloses the at least one transducer element, the support structure, and the PCB is filled with a potting material.

15. The sonar transducer assembly of claim 1, wherein at least one of the PCB or the support structure includes a plurality of guide holes or notches configured to be positioned about a guide post or rib of an assembly fixture during assembly to align the PCB with the support structure.

16. A method of assembling a sonar transducer assembly comprising:
   providing at least one transducer element;
   mounting a flexible printed circuit board (PCB) to a support structure, wherein the PCB comprises a set of electrical connections for each transducer element, wherein the set of electrical connections comprise flex tabs configured to flex out of a PCB plane defined by a body of the PCB, and wherein the support structure comprises an aperture for the at least one transducer element, wherein the support structure is configured to:
   support the body of the PCB;
   allow flexion of the flex tabs into the aperture; and
   retain the at least one transducer element in the aperture; and
   installing at least one transducer element into the aperture in a direction that is perpendicular to the PCB plane to cause the flex tabs to flex outwardly from the PCB plane, wherein the flexion of the flex tabs causes an elastic force of the flex tabs to be applied against opposing ends of the at least one transducer element.

17. The method of claim 16, wherein the at least one transducer element is not affixed to the PCB.

18. The method of claim 16, wherein the support structure comprises a foam, and wherein the method further comprises:
   cutting an H cut in the foam to form the aperture.

19. The method of claim 16, wherein the at least one transducer element comprises a plurality of transducer elements and the at least one aperture comprises a plurality of apertures, wherein each of the plurality of transducer elements is disposed in a separate one of the plurality of apertures, and wherein the plurality of transducer elements are installed substantially simultaneously by a machine.

20. A sonar transducer assembly comprising:
   a plurality of transducer elements;
   a flexible printed circuit board (PCB) comprising a plurality of sets of electrical connections for the plurality of transducer elements, wherein each of the plurality of sets of electrical connections comprise flex tabs configured to flex out of a PCB plane defined by a body of the PCB; and a support structure comprising a plurality of apertures, wherein each of the plurality of apertures is configured to receive each of the plurality of transducer elements, wherein the support structure is configured to:

support the body of the PCB;

allow flexion of each of the flex tabs into a respective aperture of the plurality of apertures; and retain each of the plurality of transducer elements in the respective aperture of the plurality of apertures, wherein each of the plurality of transducer elements is held in the PCB and the support structure through an interference fit, wherein each of the plurality of transducer elements is installed between the flex tabs.

21. The sonar transducer assembly of claim 20, wherein the plurality of transducer elements are not affixed to the PCB.

22. The sonar transducer assembly of claim 20, wherein the support structure and PCB provide resonance isolation for each of the plurality of transducer elements.

23. A sonar transducer assembly comprising:

at least one transducer element; and a flexible printed circuit board (PCB) comprising at least one set of electrical connections for the at least one transducer element, wherein the electrical connections comprise flex tabs configured to flex out of a PCB plane defined by a body of the PCB;

wherein the at least one transducer element is installed between the flex tabs, wherein flexion of the flex tabs causes an elastic force of the flex tabs to be applied against opposing ends of the at least one transducer element.

24. The sonar transducer assembly of claim 23, wherein the at least one transducer element is not affixed to the PCB.

25. The sonar transducer assembly of claim 23, wherein the at least one set of electrical connections further comprise point contacts extending outwardly from the flex tabs toward the at least one transducer element to increase pressure applied by the flex tabs on the at least one transducer element.

* * * * *